United States Patent
Nambara

(10) Patent No.: US 10,585,282 B2
(45) Date of Patent: Mar. 10, 2020

(54) HEAD-UP DISPLAY DEVICE AND IMAGE PROJECTION UNIT

(71) Applicant: DENSO CORPORATION, Kariya, Aichi-pref. (JP)

(72) Inventor: Takahiro Nambara, Kariya (JP)

(73) Assignee: DENSO CORPORATION, Kariyam Aichi-pref. (JP)

( * ) Notice: Subject to any disclaimer, the term of this patent is extended or adjusted under 35 U.S.C. 154(b) by 0 days.

(21) Appl. No.: 16/099,761

(22) PCT Filed: Apr. 7, 2017

(86) PCT No.: PCT/JP2017/014477
§ 371 (c)(1),
(2) Date: Nov. 8, 2018

(87) PCT Pub. No.: WO2017/199627
PCT Pub. Date: Nov. 23, 2017

(65) Prior Publication Data
US 2019/0179143 A1    Jun. 13, 2019

(30) Foreign Application Priority Data
May 18, 2016 (JP) .................... 2016-099852

(51) Int. Cl.
*G02B 27/01*  (2006.01)
*B60K 35/00*  (2006.01)
(Continued)

(52) U.S. Cl.
CPC ......... *G02B 27/0149* (2013.01); *B60K 35/00* (2013.01); *G02B 13/16* (2013.01);
(Continued)

(58) Field of Classification Search
None
See application file for complete search history.

(56) References Cited

U.S. PATENT DOCUMENTS 5,867,287 A * 2/1999 Williams ........... G02B 27/0101
349/11
2016/0299342 A1  10/2016 Asai
2016/0334075 A1  11/2016 Nambara

FOREIGN PATENT DOCUMENTS

JP    2010211065 A   9/2010
JP    2015133304 A   7/2015
(Continued)

*Primary Examiner* — Joseph R Haley
(74) *Attorney, Agent, or Firm* — Harness, Dickey & Pierce, P.L.C.

(57) ABSTRACT

A head-up display device projects display light of an image on a projection member to virtually display a virtual image of the image. An illumination light source unit emits an illumination light. An image display panel causes the illumination light from the illumination light source unit to pass therethrough to be emitted as a display light from a display surface to display the image. A projection lens is located between the illumination light source unit and the image display panel and projects the illumination light from the illumination light source unit onto the image display panel. The image display panel is tilted so that a normal direction to the display surface intersects with an optical axis of the illumination light source unit. The projection lens is tilted so that a radial direction of the projection lens coincides with a tangential direction to the display surface.

10 Claims, 15 Drawing Sheets

(51) Int. Cl.
*G02F 1/13* (2006.01)
*G02B 13/16* (2006.01)

(52) U.S. Cl.
CPC ......... *G02B 27/01* (2013.01); *G02B 27/0101* (2013.01); *G02F 1/13* (2013.01); *B60K 2370/334* (2019.05); *G02B 2027/015* (2013.01); *G02B 2027/0141* (2013.01); *G02B 2027/0161* (2013.01)

(56) References Cited

FOREIGN PATENT DOCUMENTS

| | | |
|---|---|---|
| JP | 2015152732 A | 8/2015 |
| JP | 5866644 B1 | 2/2016 |

* cited by examiner

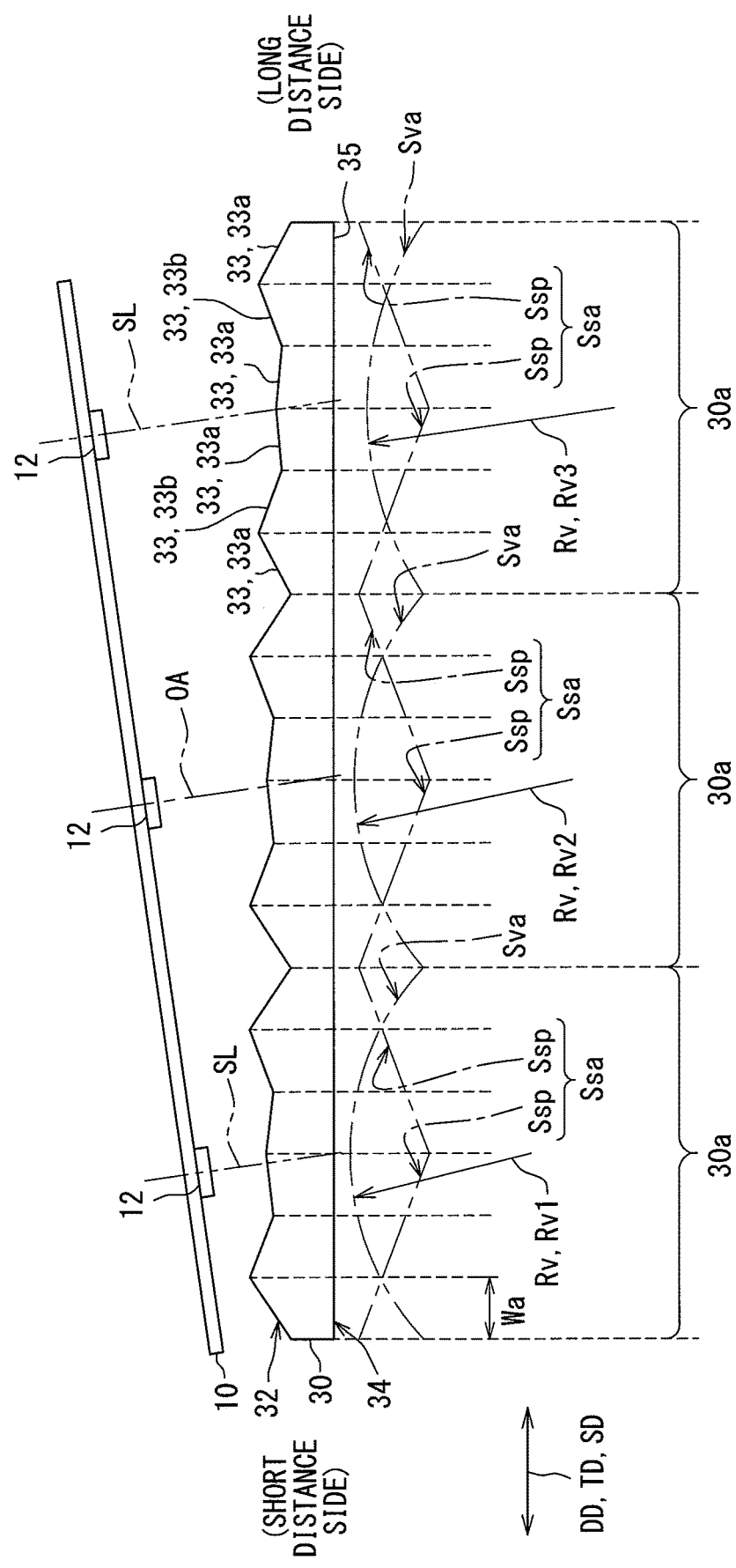

HEAD-UP DISPLAY DEVICE AND IMAGE PROJECTION UNIT

CROSS REFERENCE TO RELATED APPLICATIONS

This application is a U.S. National Phase Application under 35 U.S.C. 371 of International Application No. PCT/JP2017/014477 filed on Apr. 7, 2017. This application is based on and claims the benefit of priority from Japanese Patent Application No. 22016-099852 filed on May 18, 2016. The entire disclosures of all of the above applications are incorporated herein by reference.

TECHNICAL FIELD

The present disclosure relates to a head-up display device mounted on a movable object and configured to virtually display an image to be visible to an occupant.

BACKGROUND ART

Conventionally, a head-up display device (hereinafter abbreviated as HUD device) configured to virtually display an image to be visible to an occupant has been known. The HUD device disclosed in Patent Literature 1 includes an illumination light source unit, an image display panel, and a projection lens. The illumination light source unit emits an illumination light. The image display panel causes the illumination light from the illumination light source unit side to pass through the image display panel and to be emitted from a display surface as a display light to display an image. The projection lens is located between the illumination light source unit and the image display panel, and projects the illumination light from the illumination light source unit side onto the image display panel.

In Patent Literature 1, the image display panel is located so that an optical axis of the illumination light source unit coincides with a normal direction of the display surface. Further, the projection lens is located so that the optical axis is orthogonal to a radial direction of the projection lens.

The present inventor has considered that the image display panel is tilted so that the normal direction of the display surface intersects with the optical axis. According to the tilted image display panel, even when an external light such as sunlight enters the image display panel in a direction opposite to the display light, since the normal direction of the display surface intersects with the external light, the external light is restricted from being reflected by the display surface and visually recognized together with the display light.

On the other hand, the present inventor has found out that the following unique issue arises in the HUD device in which the projection lens for projecting the illumination light onto the tilted image display panel is located such that a radial direction of the projection lens is orthogonal to the optical axis. More specifically, when the projection lens and the image display panel are placed on an optical path with the avoidance of mutual interference between the projection lens and the image display panel, an interval between the projection lens and the image display panel is partially widened due to an angular difference of the placement, and a dead space may occur between the projection lens and the image display panel. As a result, for example, a size of the HUD device increases due to an increase in a distance from the illumination light source unit to a tip of the image display panel. In other words, the mountability of the HUD device to a movable object is deteriorated.

PRIOR TECHNICAL LITERATURE

Patent Literature

PATENT LITERATURE 1: JP 2015-133304 A

SUMMARY OF INVENTION

It is an object of the present disclosure to provide an HUD device with high mountability to a movable object.

According to one aspect of the present disclosure, a head-up display device is configured to be mounted on a movable object and to project a display light of an image on a projection member to display a virtual image of the image to be visually recognizable by an occupant. The head-up display device comprises an illumination light source unit configured to emit an illumination light. The head-up display device further comprises an image display panel configured to cause the illumination light from the illumination light source unit to pass therethrough to be emitted as the display light from a display surface to display the image. The head-up display device further comprises a projection lens located between the illumination light source unit and the image display panel and configured to project the illumination light from the illumination light source unit onto the image display panel. The image display panel is tilted to cause a normal direction to the display surface to intersect with an optical axis of the illumination light source unit. The projection lens is tilted to cause a radial direction of the projection lens to coincide with a tangential direction to the display surface.

According to one aspect of the present disclosure, an image projection unit is for a head-up display device. The head-up display device is configured to be mounted on a movable object and to project a display light of an image on a projection member to display a virtual image of the image to be visually recognizable by an occupant. The image projection unit is configured to project the display light onto a light guide unit, which is configured to guide the display light to the projection member. The image projection unit comprises an illumination light source unit configured to emit an illumination light. The image projection unit comprises an image display panel configured to cause the illumination light from the illumination light source unit to pass therethrough and to be emitted as the display light from a display surface to display the image. The image projection unit comprises a projection lens located between the illumination light source unit and the image display panel and configured to project the illumination light from the illumination light source unit onto the image display panel. The image display panel is tilted to cause a normal direction to the display surface to intersect with an optical axis of the illumination light source unit. The projection lens is tilted to cause a radial direction of the projection lens to coincide with a tangential direction to the display surface.

BRIEF DESCRIPTION OF THE DRAWINGS

The above and other objects, features and advantages of the present disclosure will become more apparent from the following detailed description made with reference to the accompanying drawings. In the drawings:

FIG. 18 is a diagram corresponding to FIG. 8 in Modifications 3 and 4.

DESCRIPTION OF EMBODIMENTS

Hereinafter, description will be given of the multiple embodiments of the present disclosure based on the drawings. Corresponding constituent elements in each embodiment are given the same signs, and there are cases in which duplicated explanation is omitted. In a case in which only a portion of the configuration in each embodiment is described, the configuration of another embodiment which is described earlier may be applied for the other portions of the configuration. In addition to the combinations of configurations clearly depicted in the explanation of the embodiments, as long as issues do not particularly arise in a combination, the configurations of multiple embodiments may be partially combined with each other, even when not clearly described.

First Embodiment

Figure 1:
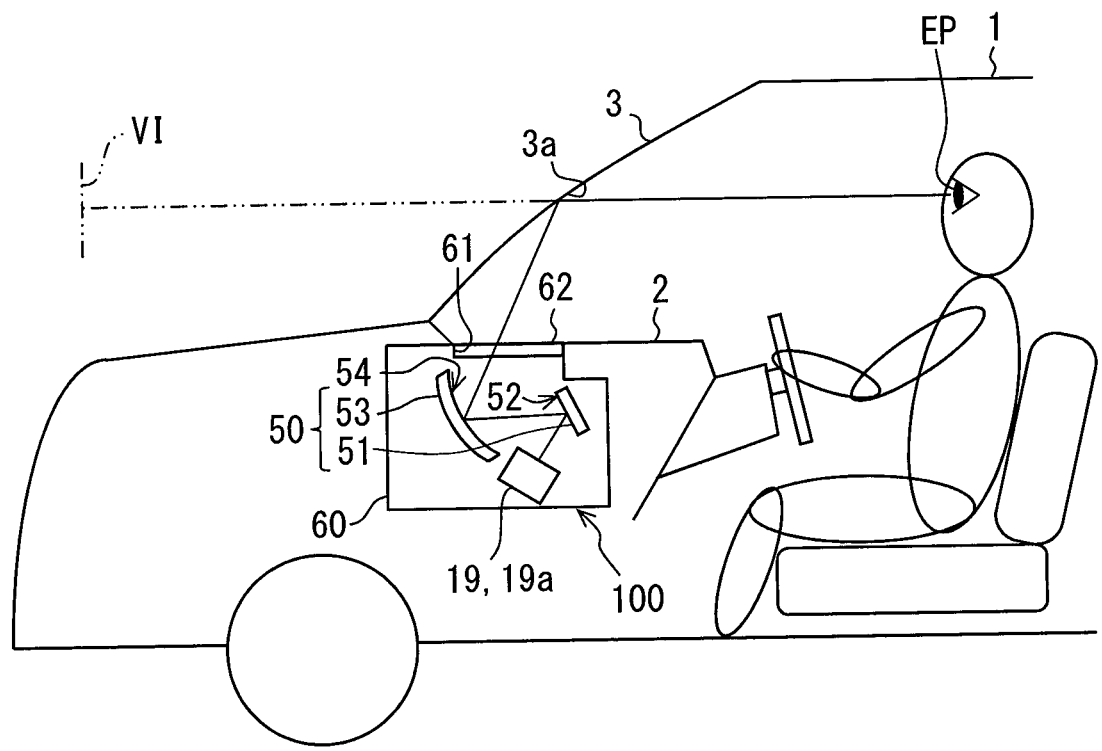
FIG. 1 is a schematic diagram showing an installed state of an HUD device in a vehicle according to a first embodiment.

As illustrated in FIG. 1, an HUD device 100 according to a first embodiment of the present disclosure is installed in a vehicle 1 that is one type of a mobile object, and is housed in an instrument panel 2. The HUD device 100 projects display light of an image onto a windshield 3 which serves as a projection member of the vehicle 1. With the above configuration, the HUD device 100 virtually displays an image in such a manner as to be visible to an occupant in the vehicle 1. In other words, a display light which is reflected on the windshield 3 reaches an eye point EP of the occupant in a vehicle interior of the vehicle 1, and the occupant senses the display light as a virtual image VI. The occupant is capable of recognizing various pieces of information which are displayed as the virtual image VI. Examples of various pieces of information which is displayed as the virtual image VI include vehicle state values such as vehicle speed and remaining fuel level, or vehicle information such as road information and visibility auxiliary information.

The windshield 3 of the vehicle 1 is formed in a plate-shape and made of a light transmissive glass or a synthetic resin. In the windshield 3, a projection surface 3a onto which the display light is projected is formed into a smooth concave surface shape or a flat surface shape. As the projection member, instead of the windshield 3, a combiner that is separate from the vehicle 1 may be installed inside the vehicle 1, and the image may be projected onto the combiner. Further, the HUD device 100 per se may include a combiner as a projection member.

A specific configuration of the HUD device 100 described above will be described below with reference to FIGS. 1 to 9. The HUD device 100 includes an illumination light source unit 10, a condenser lens 20, a projection lens 30, an image display panel 40, and a light guide unit 50. Those components are housed and held in a housing 60.

Figure 2:
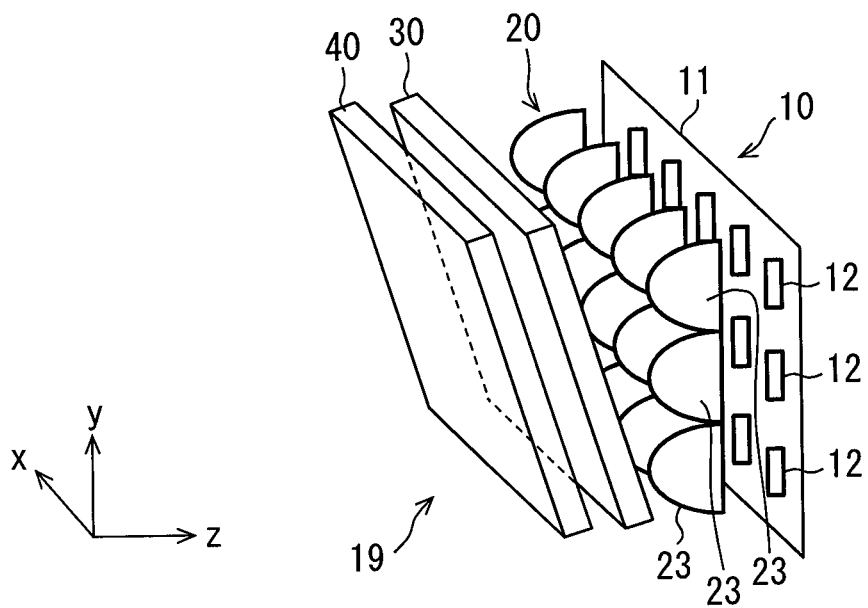
FIG. 2 is a perspective view schematically showing an image projection unit according to the first embodiment.

In this example, as shown in FIGS. 1 and 2, an image projection unit 19 is includes the illumination light source unit 10, the condenser lens 20, the projection lens 30, and the image display panel 40. The respective elements 10, 20, 30, and 40 of the image projection unit 19 are housed in a casing 19a having a light shielding property.

Figure 3:
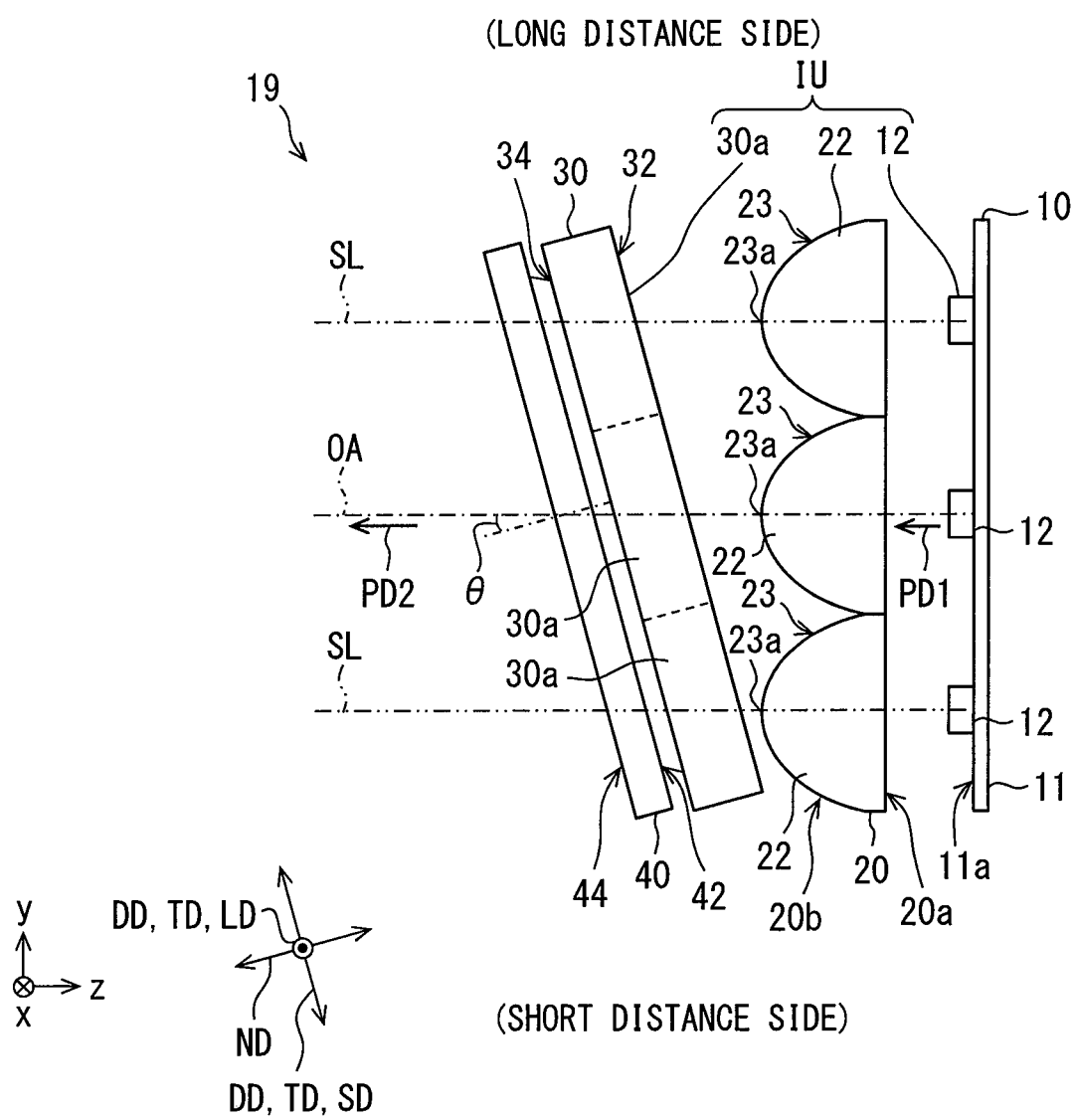
FIG. 3 is a diagram showing an image projection unit according to the first embodiment, which is a cross-sectional view schematically showing a yz cross section.
Figure 4:
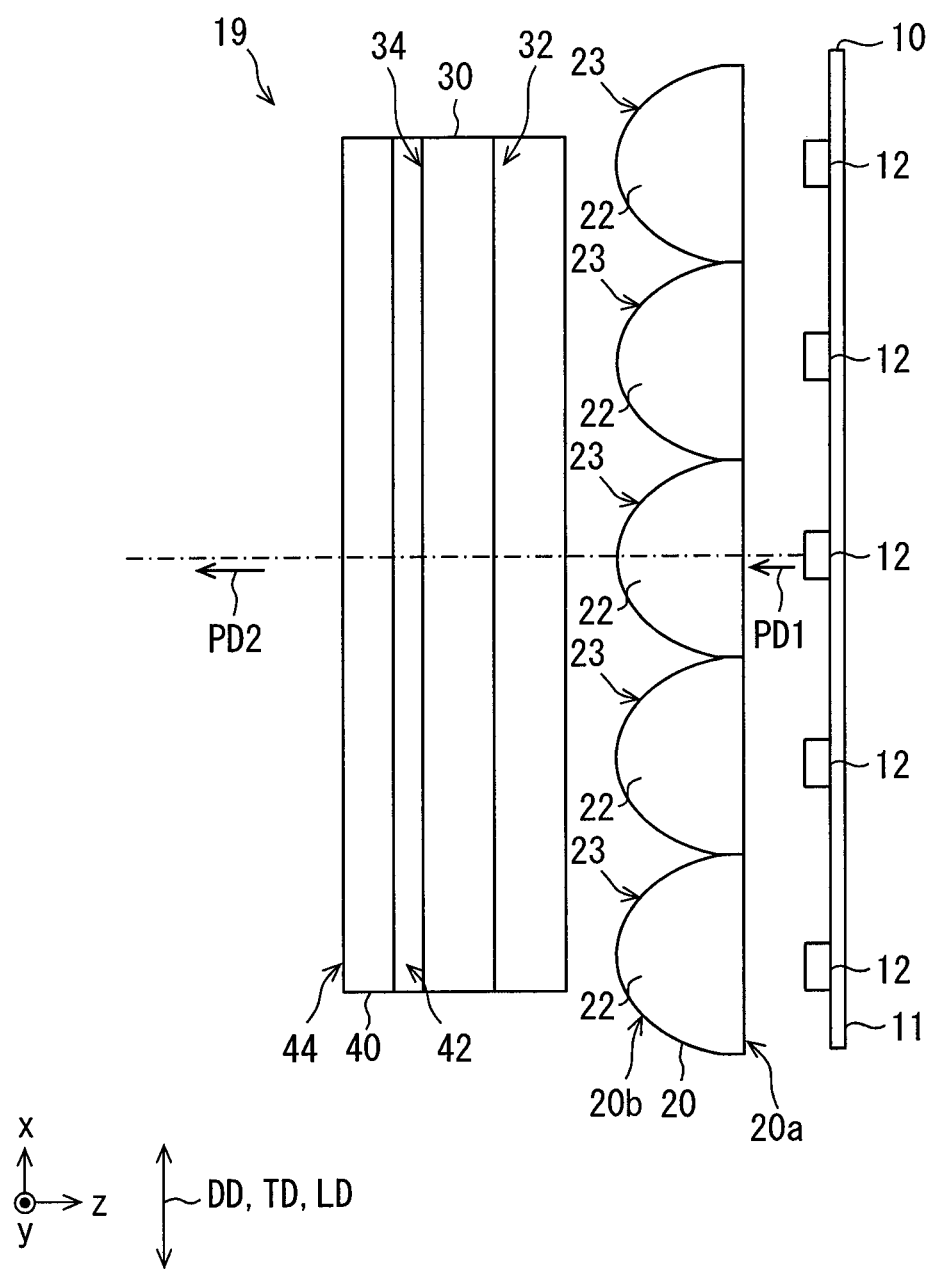
FIG. 4 is a diagram showing an image projection unit according to the first embodiment, which is a cross-sectional view schematically showing an xz cross section.

As shown in FIGS. 2 to 4, the illumination light source unit 10 includes a light source circuit board 11 and multiple light emitting devices 12. The light source circuit board 11 has a planar mounting surface 11a. The respective light emitting devices 12 are, for example, light emitting diode devices with little heat generation and are arrayed on the mounting surface 11a. The respective light emitting devices 12 are electrically connected to a power supply through a wiring pattern on the mounting surface 11a. More specifically, each of the light emitting devices 12 is formed by sealing a chip-shaped blue light emitting diode device with a yellow phosphor in which a light transmissive synthetic resin is mixed with a yellow fluorescent agent. The yellow phosphor is excited by the blue light emitted according to a current amount from the blue light emitting diode device to emit a yellow light, and illumination light of pseudo white is emitted by mixture of the blue light with the yellow light.

In the present embodiment, the respective light emitting devices 12 are arrayed in a lattice pattern with two directions orthogonal to each other on the mounting surface 11a as array-directions. In the respective array directions, the number of light emitting devices 12 is, for example, 3×5, that is, 15 in total.

In the present embodiment, a normal direction to the planar mounting surface 11a of the light source circuit board 11 is defined as a z-direction. A direction in which the number of aligned elements is larger, that is, a direction in which five elements are aligned among directions along the mounting surface 11a is defined as an x-direction. A direction in which the number of aligned elements is smaller, that is, a direction in which three elements are aligned is defined as a y-direction.

Each of the light emitting devices 12 emits a light with a predetermined light emission intensity distribution, and is located such that a light emission peak direction PD1 at which a light emission intensity becomes maximum is aligned with the z-direction (refer to FIGS. 3 and 4). Therefore, in the present embodiment, it is assumed that an optical axis OA of the illumination light source unit 10 defined based on the configuration of the illumination light source unit 10 is defined as an axis along the z-direction which is the light emission peak direction PD1. In more detail, the optical axis OA is defined as an axis that passes through a middle light emitting device 12 located at the center of the illumination light source unit 10 and extends along the z-direction, which is the light emission peak direction PD1. In other words, the illumination light source unit 10 emits the illumination light in a direction along the optical axis OA by the respective light emitting devices 12. The illumination light emitted from the illumination light source unit 10 is made incident on the condenser lens 20.

The condenser lens 20 is located between the illumination light source unit 10 and the projection lens 30. The condenser lens 20 condenses the illumination light from the illumination light source unit 10 side and emits the condensed illumination light toward the projection lens 30.

More specifically, the condenser lens 20 is configured by a lens array in which multiple convex lens elements 22 made of light transmissive synthetic resin or glass or the like are arrayed and formed integrally. The respective convex lens elements 22 are configured by lens elements of the same number as that of the light emitting devices 12 so as to be paired with the light emitting devices 12 individually. In other words, the convex lens elements 22 are arrayed in a matrix of 3×5, that is, 15 in total. In the condenser lens 20, an incident side surface 20a facing the illumination light source unit 10 is a single plane having a smooth planar shape common to the respective convex lens elements 22. On the other hand, on an emission side surface 20b facing the projection lens 30 in the condenser lens 20, light condensing surfaces 23 individually provided for the respective convex lens elements 22 are arrayed.

The condensing surfaces 23 have substantially the same shape among the convex lens elements 22, and each light condensing surface 23 is formed into a smooth convex shape by being curved into a convex shape protruding toward the projection lens 30 side. In the present embodiment, intervals of the light emitting devices 12 aligned with each other and intervals of surface vertices of the light condensing surfaces 23 aligned with each other are substantially equal to each other. Furthermore, a distance between each light emitting device 12 and the surface vertex 23a of the light condensing surface 23 of the paired convex lens element 22 is substantially equal to each other in the respective pairs. In other words, since an array direction of the light emitting devices 12 substantially coincides with a direction of the aligned convex lens elements 22 so that a radial direction of the condenser lens 20 is located substantially perpendicular to the optical axis OA (that is, the z-direction).

Now, a detailed shape of each light condensing surface 23 will be described. In particular, in the present embodiment, each light condensing surface 23 is an aspherical surface that is rotationally symmetric with reference to the surface vertex 23a. Specifically, each light condensing surface 23 is formed in a parabolic shape in an xz cross section (refer to FIG. 4) and is also formed in the parabolic shape in a yz cross section (refer to FIG. 3), to thereby provide a paraboloidal shape.

The projection lens 30 is located between the illumination light source unit 10 and the image display panel 40, and more precisely, between the condenser lens 20 and the image display panel 40. The projection lens 30 is adapted to project the illumination light incident from the illumination light source unit 10 side onto the image display panel 40.

Figure 5:
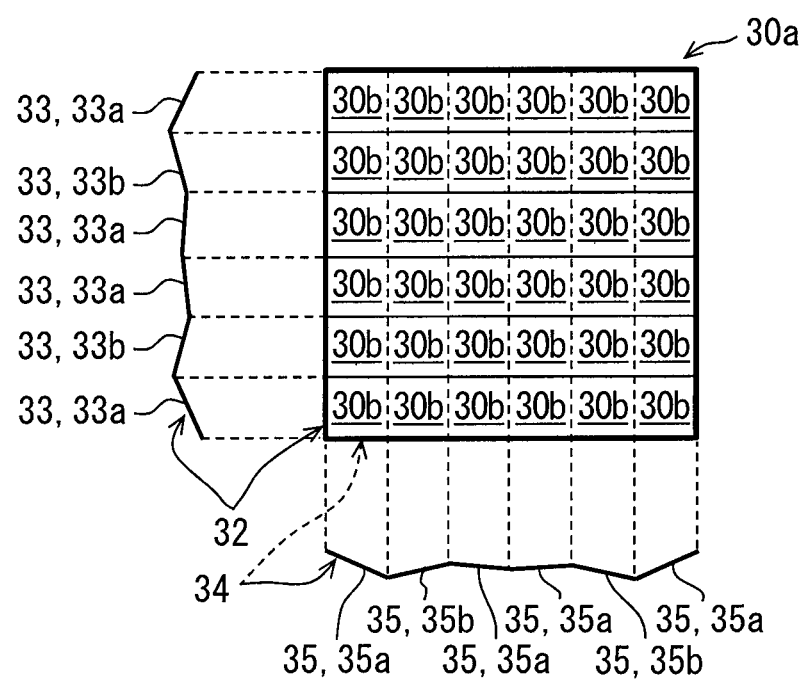
FIG. 5 is a partial front view of a projection lens according to the first embodiment, which is a diagram illustrating a deflection element in one divided block.

More specifically, the projection lens 30 is configured by a lens array in which multiple deflection elements 30b made of light transmissive synthetic resin or glass or the like are arrayed and formed integrally, and has a substantially plate-like shape as a whole. The deflection elements 30b are arrayed along a radial direction DD of the projection lens 30. Each deflection element 30b can deflect a traveling direction of the illumination light by refraction at divided lens surfaces 33 and 35 which will be described later. In the projection lens 30 according to the present embodiment, divided blocks 30a in which the projection lens 30 is virtually divided can be defined corresponding to a direction and the number of the multiple array light emitting devices 12. In particular, according to the present embodiment, a total of 3×5, that is, 15 divided blocks 30a can be defined in which the projection lens 30 is divided into three pieces in the y-direction corresponding to the number of aligned light emitting devices 12, and the projection lens 30 is divided into five pieces in the x-direction corresponding to the number of aligned light emitting devices 12. As shown in FIG. 5, the projection lens 30 configures the multiple deflection elements 30b arrayed in those respective divided blocks 30a. In the present embodiment, a total of 36 (6×6) deflection elements 30b corresponding to the number of divided lens surfaces 33 and 35, which will be described later, are arrayed in one divided block 30a.

As shown in FIGS. 2 to 4, in the projection lens 30 having a substantially plate-like shape according to the present embodiment, the radial direction DD of the projection lens 30 coincides with an extension direction perpendicular to a plate thickness direction. The projection lens 30 is tilted so that the plate thickness direction intersects with the optical axis OA (that is, the z-direction).

The image display panel 40 is configured by a liquid crystal panel formed of a thin film transistor (TFT) and includes, for example, an active matrix liquid crystal panel formed of multiple liquid crystal pixels 40a that are arrayed in two directions.

Figure 6:
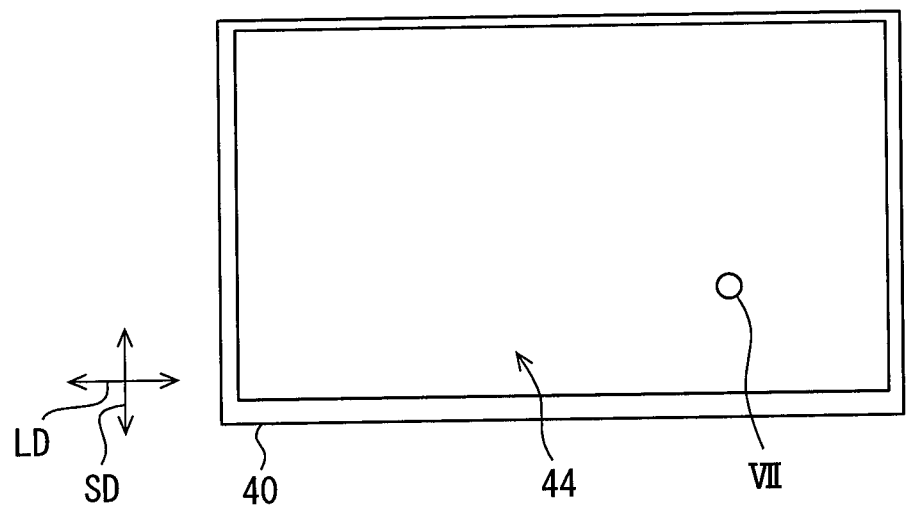
FIG. 6 is a diagram showing an image display panel as viewed along a normal direction to a display surface according to the first embodiment.
Figure 7:
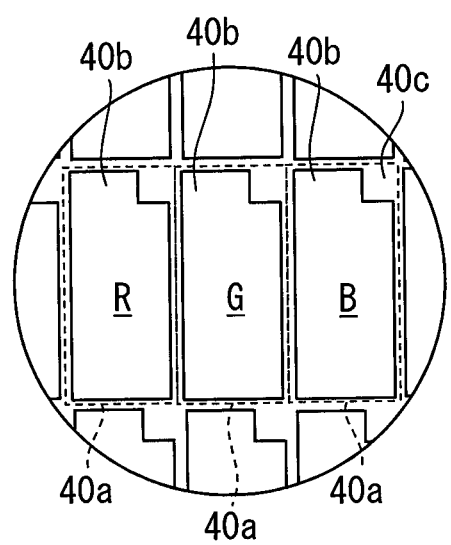
FIG. 7 is an enlarged view of a portion VIII of FIG. 5.

Specifically, as shown in FIG. 6, the image display panel 40 has a rectangular shape having a longitudinal direction LD and a short direction SD. As shown in FIG. 7, since the liquid crystal pixels 40a are arrayed in the longitudinal direction LD and the short direction SD, a display surface 44 that displays an image on the light guide unit 50 side also has a rectangular shape. In each liquid crystal pixel 40a, a transmissive portion 40b penetrating through the display surface 44 in a normal direction ND and a wiring portion 40c formed so as to surround the transmissive portion 40b are provided.

Since the image display panel 40 is formed by laminating a pair of polarizing plates and a liquid crystal layer sandwiched between the pair of polarizing plates, the image display panel 40 has a plate-like shape. Each polarizing plate has a property of transmitting a light polarized in a predetermined direction and absorbing a light polarized in a direction perpendicular to the predetermined direction, and the pair of polarizing plates are located such that the predetermined directions are orthogonal to each other. The liquid crystal layer can rotate a polarization direction of the light incident on the liquid crystal layer according to an applied voltage by applying the voltage for each liquid crystal pixel 40*a*. A ratio of the light transmitted through the later polarizing plate due to the rotation of the polarization direction, that is, a transmittance can be changed.

Therefore, the image display panel 40 controls the transmittance of the illumination light for each liquid crystal pixel 40*a* against the incidence of the illumination light on an illumination target surface 42 which is a surface on the illumination light source unit 10 side. In other words, the image display panel 40 transmits a part of the illumination light from the illumination light source unit 10 side and emits the transmitted illumination light from the display surface 44 which is a surface of the light guide unit 50 side as display light, thereby being capable of displaying the image. Color filters of mutually different colors (for example, red, green, and blue) are provided in adjacent liquid crystal pixels 40*a*, and various colors are realized by the combinations of those color filters.

The display surface 44 is formed so as to be able to reflect the light incident on the image display panel 40 from the light guide unit 50 side with the use of a mirror-like surface of a glass substrate in the image display panel 40, for example.

As shown in FIGS. 2 to 4, the illumination light enters the illumination target surface 42 of the image display panel 40 along the optical axis OA. On the other hand, the image display panel 40 is tilted so that the normal direction ND to the illumination target surface 42 and the display surface 44 intersects with the optical axis OA. Specifically, the image display panel 40 is tilted so that the longitudinal direction LD is orthogonal to the optical axis OA and the short direction SD is tilted relative to the optical axis OA in the tangential directions TD to the display surface 44. The longitudinal direction LD extends along the x-direction. In other words, the image display panel 40 is rotated with the longitudinal direction LD (that is, the x-direction) as a rotation axis from a posture in which the normal direction to the display surface 44 is orthogonal to the optical axis OA. An intersection angle θ of the normal direction ND of the display surface 44 to the optical axis OA is, for example, about 10 to 25 degrees.

Since there is basically no element for deflecting the light in the image display panel 40 of the present embodiment, an emission peak direction PD2, in which an emission intensity is the largest among the display light, is not changed in the image display panel 40, and extends roughly along the optical axis OA. In other words, the emission peak direction PD2 of the display light is different from the normal direction ND to the display surface 44. In this way, the image projection unit 19 projects the display light toward the light guide unit 50.

As shown in FIG. 1, the light guide unit 50 guides the display light from the image display panel 40 of the image projection unit 19 to the windshield 3. The light guide unit 50 according to the present embodiment has a plane mirror 51 and a concave mirror 53. In the present embodiment, the display light from the image display panel 40 first enters the plane mirror 51.

The plane mirror 51 is formed by depositing aluminum as a reflection surface 52 on a surface of a base material made of synthetic resin or glass, or the like. The reflection surface 52 is formed in a smooth planar shape. The display light incident on the plane mirror 51 is reflected by the reflection surface 52 toward the concave mirror 53.

The concave mirror 53 is formed by depositing aluminum as a reflection surface 54 on a surface of a base material made of synthetic resin, glass, or the like. The reflection surface 54 is curved in a concave shape concaved in the center of the concave mirror 53 so as to be formed in a smooth concave surface shape. The display light incident on the concave mirror 53 is reflected by the reflection surface 54 toward the windshield 3.

A window 61 is provided in the housing 60 between the concave mirror 53 and the windshield 3. The window 61 is closed with a light transmissive dustproof cover 62. Therefore, the display light from the concave mirror 53 passes through the dustproof cover 62 and is incident on the windshield 3. In this way, the occupant can visually recognize the display light reflected by the windshield 3 as the virtual image VI.

In such an HUD device 100, an external light of, for example, sunlight or the like may pass through the windshield 3 and enter the window 61. A part of the external light incident on the window 61 may be reflected in reverse to the display light, in other words, reflected by the concave mirror 53 and the plane mirror 51 of the light guide unit 50 in order, and be reflected on the display surface 44 of the image display panel 40. In this example, in the image display panel 40, since the normal direction ND to the display surface 44 intersects the optical axis OA, the external light incident on the display surface 44 can be reflected in a direction different from that of the display light.

It is preferable that an inclination direction or an angle of the image display panel 40 is set so as to satisfy a Scheimpflug condition or to come close to the condition in consideration of placement angles of the plane mirror 51, the concave mirror 53, and the windshield 3. According to the inclination direction and the angle described above, the virtual image VI viewed from the eye point EP can be restricted from being inclined and visually recognized.

As shown in FIGS. 2 to 4, the projection lens 30 is also tilted corresponding to the image display panel 40. Specifically, the projection lens 30 is tilted so that the radial direction DD of the projection lens 30 is aligned with the tangential direction TD to the display surface 44. As a result, as described above, the plate thickness direction of the projection lens 30 intersects with the optical axis OA (that is, the z-direction).

The image display panel 40 and the projection lens 30 according to the present embodiment are located so as to avoid an interference with each other. In the present specification, the interference includes not only a spatial interference that the image display panel 40 collides with the projection lens 30 but also an optical interference. If an interval between the image display panel 40 and the projection lens 30 is partially narrowed by an angular difference of placement, Moire fringes can be observed only in a part of the image. In such Moiré fringes, there is a concern that boundaries between the adjacent deflection elements 30*b* in the projection lens 30 described above may be emphasized.

Taking the above issues into consideration, it is preferable that the interval between the image display panel 40 and the projection lens 30 is kept constant. In particular, in the present embodiment, when the interval between the image display panel 40 and the projection lens 30 is kept constant, the image display panel 40 and the projection lens 30 are located in parallel to each other.

A shape of the projection lens 30 is adapted to such a tilted placement. Hereinafter, the shape of the projection lens 30 will be described in detail with reference to FIGS. 8 and 9.

Figure 8:
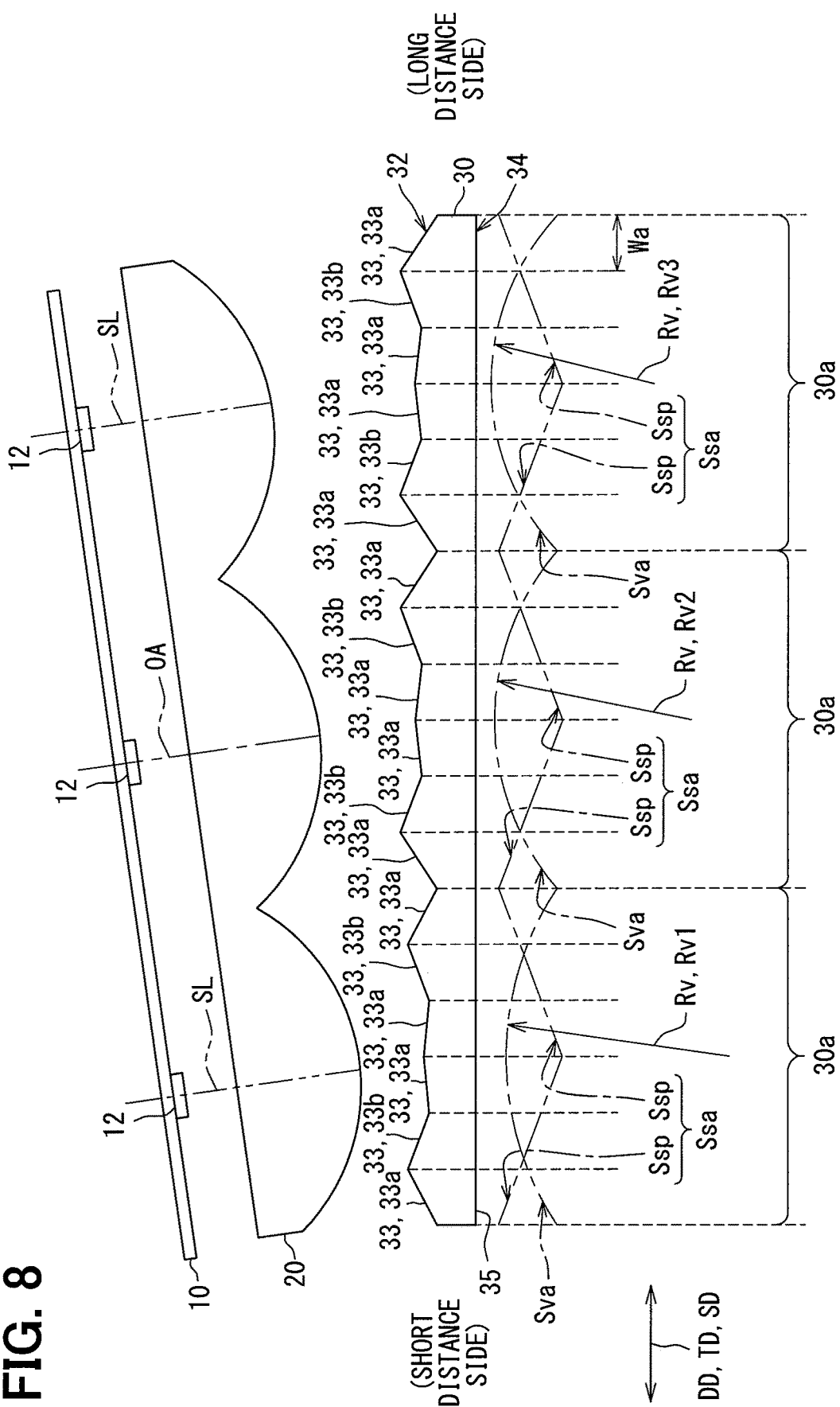
FIG. 8 is a diagram illustrating an incident side surface of a projection lens according to the first embodiment.

As shown in FIG. 8, on the incident side surface 32 of the projection lens 30 which faces the condenser lens 20, the multiple divided lens surfaces 33 are formed as components of the deflection elements 30*b* in a state of being divided into stripes so as to be coincident with the boundaries between the adjacent deflection elements 30b. A dividing direction of the divided lens surfaces 33 on the incident side surface 32 is along the short direction SD inclined, for example, by about 10 to 25 degrees from the y-direction. Therefore, in the xz cross section, one divided lens surface 33 is formed across the deflection element 30b and the divided block 30a. Each divided lens surface 33 is located such that a component of the divided lens surface 33 in the xz cross section in the normal direction to the divided lens surface 33 is aligned with the optical axis OA and a component of the divided lens surface 33 in the yz cross section in the normal direction to the divided lens surface 33 intersects with the optical axis OA. Therefore, the incident side surface 32 is mainly configured to deflect the traveling direction of the illumination light in the yz cross section.

Figure 9:
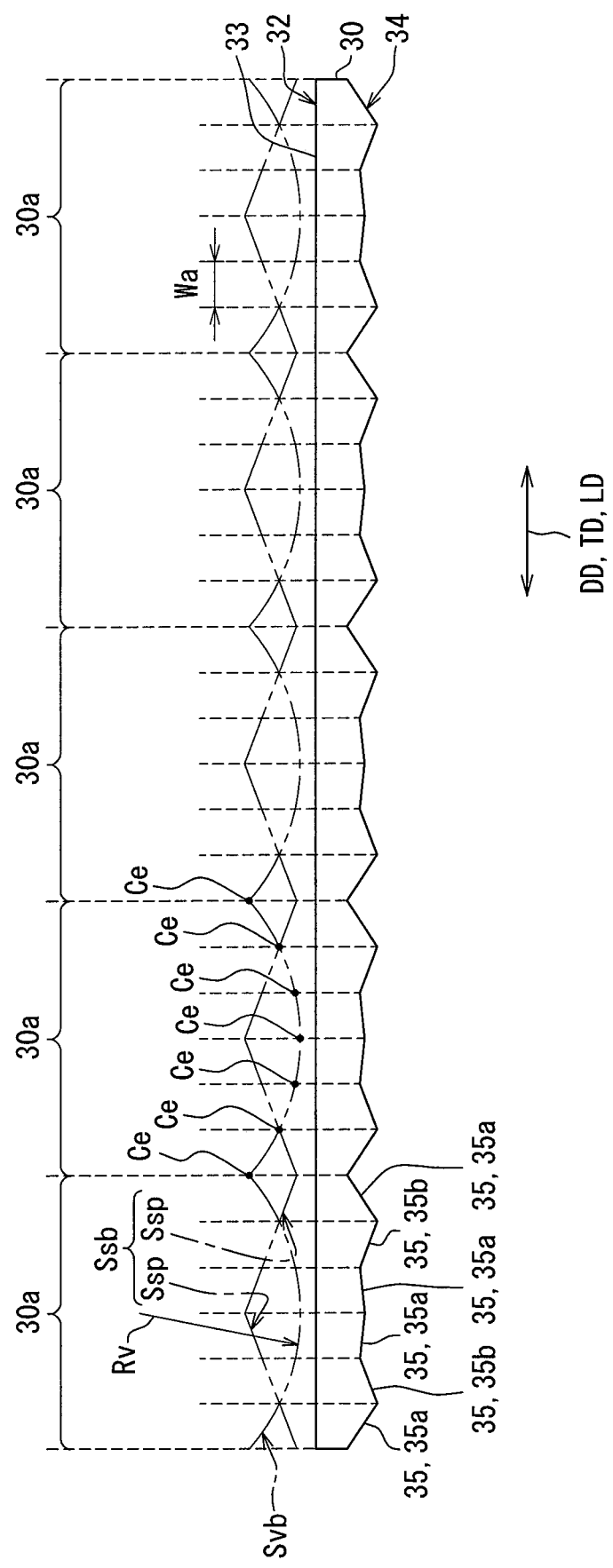
FIG. 9 is a diagram illustrating an emission side surface of the projection lens according to the first embodiment.

On the other hand, as shown in FIG. 9, on the emission side surface 34 of the projection lens 30 which faces the image display panel 40, the multiple divided lens surfaces 35 are formed as components of the deflection elements 30b in a state of being divided into stripes so as to be coincident with the boundaries between the adjacent deflection elements 30b. The dividing direction of the divided lens surfaces 35 in the emission side surface 34 is aligned with the longitudinal direction LD (that is, the x-direction). Therefore, in the yz cross section, one divided lens surface 35 is formed across the deflection element 30b and the divided block 30a. Each divided lens surface 35 is located such that a component of the divided lens surface 35 in the yz cross section in the normal direction to the divided lens surface 35 is aligned with the optical axis OA and a component of the divided lens surface 35 in the xz cross section in the normal direction to the divided lens surface 35 intersects with the optical axis OA. Therefore, the emission side surface 34 is mainly configured to deflect the traveling direction of the illumination light in the xz cross section.

First, each divided lens surface 35 on the emission side surface 34 will be described. The emission side surface 34 has substantially the same shape for each of the divided blocks 30a which are divided into five pieces according to the number of aligned light emitting devices 12 corresponding to the x-direction.

In this example, when attention is focused on one divided block 30a, multiple approximate planes 35a and multiple anisotropic deflection planes 35b are provided as the divided lens surfaces 35. The respective approximate planes 35a and the respective anisotropic deflection planes 35b are formed as one divided region which is divided with a predetermined division width Wa. In the present embodiment, the predetermined division width Wa is set to be substantially constant.

The approximate planes 35a are formed based on a virtual convex curved surface Svb defined as a virtual lens surface in the projection lens 30. In this example, the virtual convex curved surface Svb has a smooth cylindrical surface shape which is curved into a convex shape convexed toward the image display panel 40 side in the xz cross section. The approximate planes 35a are formed in a planar shape as an approximate plane obtained by linear interpolation of multiple coordinates extracted from the virtual convex curved surface Svb. In particular, in the present embodiment, as the multiple coordinates, end coordinates Ce of the virtual convex curved surfaces Svb at ends of the divided regions are adopted, and a gradient of the approximate planes 35a is defined by linear interpolation between the end coordinates Ce. The virtual convex curved surface Svb appears on the emission side surface 34 in a state of being planar by partial approximation.

The anisotropic deflection planes 35b are interposed between the approximate planes 35a. The anisotropic deflection planes 35b are formed based on a virtual inclined surface Ssb defined as a virtual lens plane in the projection lens 30. The virtual inclined surface Ssb is configured by multiple planar inclined surfaces Ssp that change in a reverse gradient at a position corresponding to a surface vertex of the virtual convex curved surface Svb in the xz cross section and the gradient of each planar inclined surface Ssp is set to be a gradient in a direction opposite to that of the gradient of a corresponding portion of the virtual convex curved surface Svb. When a part of the virtual inclined surface Ssb is extracted, the anisotropic deflection plane 35b appears on the emission side surface 34.

In particular, in the present embodiment, six divided lens surfaces 35 are set for one divided block 30a. The six divided lens surfaces 35 are arrayed in the order of the approximate plane 35a, the anisotropic deflection plane 35b, the approximate plane 35a, the approximate plane 35a, the anisotropic deflection plane 35b, and the approximate plane 35a, and a boundary between the adjacent approximate planes 35a corresponds to a surface vertex of the virtual convex curved surface Svb. Therefore, since the gradient is switched to the reverse gradient for each of the divided lens surfaces 35, even if the boundary between the divided lens surfaces 35 is connected to each other without a step, the projection lens 30 is kept substantially in a plate-like shape.

Next, each divided lens surface 33 on the incident side surface 32 will be described. As shown in FIG. 8, the incident side surface 32 is configured with a different shape for each of the divided blocks 30a which are divided into three pieces according to the number of aligned light emitting devices 12 corresponding to the x-direction.

In this example, when attention is focused on one divided block 30a, as with the emission side surface 34, multiple approximate planes 33a and multiple anisotropic deflection planes 33b are provided as the divided lens surfaces 33. The respective approximate planes 33a and the respective anisotropic deflection planes 33b are formed as one divided region which is divided with a predetermined division width Wa. In the present embodiment, the predetermined division width Wa is set to be substantially constant.

The approximate planes 33a are formed based on a virtual convex curved surface Sva defined as a virtual lens surface in the projection lens 30. In this example, the virtual convex curved surface Sva has a smooth cylindrical surface shape which is curved into a convex shape convexed toward the condenser lens 20 side in the yz cross section. The approximate planes 33a are formed in a planar shape as an approximate plane obtained by linear interpolation of multiple coordinates extracted from the virtual convex curved surface Sva. In particular, in the present embodiment, as the multiple coordinates, end coordinates Ce of the virtual convex curved surfaces Sva at ends of the divided regions are adopted, and a gradient of the approximate planes 33a is defined by linear interpolation between the end coordinates Ce. The virtual convex curved surface Sva appears on the incident side surface 32 in a state of being planar by partial approximation. It should be noted that the end coordinates Ce are shown in a part of FIG. 9 and are omitted in FIG. 8 because of the same.

The anisotropic deflection planes 33b are interposed between the approximate planes 33a. The anisotropic deflection planes 33b are formed based on a virtual inclined surface Ssa defined as a virtual lens plane in the projection lens 30. The virtual inclined surface Ssa is configured by multiple planar inclined surfaces Ssp that change in a reverse gradient at a position corresponding to a surface vertex of the virtual convex curved surface Sva in the yz cross section and the gradient of each planar inclined surface Ssp is set to be a gradient in a direction opposite to that of the gradient of a corresponding portion of the virtual convex curved surface Sva. A part of the virtual inclined surface Ssa is extracted and appears on the emission side surface 34.

In particular, in the present embodiment, six divided lens surfaces 33 are set for one divided block 30a. The six divided lens surfaces 33 are arrayed in the order of the approximate plane 33a, the anisotropic deflection plane 33b, the approximate plane 33a, the approximate plane 33a, the anisotropic deflection plane 33b, and the approximate plane 33a, and a boundary between the adjacent approximate planes 33a corresponds to a surface vertex of the virtual convex curved surface Sva. Therefore, since the gradient is switched to the reverse gradient for each of the divided lens surfaces 33, even if the boundary between the divided lens surfaces 33 is connected to each other without a step, the projection lens 30 is kept substantially in a plate-like shape.

In this example, in the incident side surface 20a, unlike the emission side surface 20b, the gradient of the approximate plane 33a is different for each divided block 30a. In detail, the radius of curvature Rv of the virtual convex curved surface Sva as the base is different in each of the divided blocks 30a. Therefore, the gradient of the approximate plane 33a is different for each of the divided blocks 30a.

In particular, in the present embodiment, the radius of curvature Rv of the virtual convex curved surface Sva of each divided block 30a changes so as to be smaller from a short distance side of the tilted projection lens 30 where a distance from the illumination light source unit 10 is short toward a long distance side of the tilted projection lens 30 where the distance from the illumination light source unit 10 is a long distance. Specifically, when it is assumed that the radius of curvature is set to Rv1, Rv2, and Rv3 in order from the divided block 30a on the short distance side, Rv1<Rv2<Rv3 is satisfied. Therefore, the gradient of the approximate plane 33a in the divided block 30a on the long distance side is relatively large as compared with the gradient on the short distance side.

The gradient of the anisotropic deflection plane 33b is set to be substantially equal in each divided block 30a.

For each divided block 30a in the yz cross section, a portion on the approximate plane 33a corresponding to the surface vertex of the virtual convex curved surface Sva is aligned substantially with a straight line SL extending along the optical axis OA toward the projection lens 30 side from the surface vertex 23a of the corresponding light condensing surface 23 in the condenser lens 20. With the above correspondence relationship, one illumination unit IU is configured by one light emitting device 12, one convex lens element 22, and one divided block 30a corresponding to each other (also refer to FIGS. 3 and 4). The illumination light source unit 10, the condenser lens 20, and the projection lens 30 in the present embodiment can be understood as an array of such illumination units IU.

The illumination light from the light condensing surface 23 located closer to the illumination light source unit 10 than the projection lens 30 is incident on each of the divided lens surfaces 33. Among the incident illumination light, the traveling direction of the illumination light incident on the approximate plane 33a is deflected so as to come closer to the corresponding straight line SL. In this example, the amount of deflection by which the illumination light is deflected corresponds to the gradient of each approximate plane 33a with respect to the radial direction DD.

In the present embodiment, a composite focal point of the condenser lens 20 and the projection lens 30 can be defined according to the radius of curvature of the light condensing surface 23 of the condenser lens 20 and the radius of curvature Rv of the virtual convex curved surfaces Sva and Svb which are the basis of the approximate planes 33a and 35a of the projection lens 30. Since the position of the composite focal point and the position of the illumination light source unit 10 are set to come close to each other, the illumination lights refracted by the different approximate planes 33a are deflected so that the components in the traveling direction in the yz cross section come close to each other. In addition, the illumination lights refracted by the different approximate planes 35a are deflected so that the components in the traveling direction in the xz cross section come close to each other. Therefore, the illumination lights refracted by the different deflection elements 30b are collimated more than the illumination light before being incident on the projection lens 30.

In more detail, a composite focal point of the convex lens element 22 and the divided block 30a can be defined according to the radius of curvature of the light condensing surface 23 in each illumination unit IU and the radius of curvature Rv of the virtual convex curved surfaces Sva and Svb which are the basis of the approximate planes 33a and 35a in the divided block 30a. The position of the composite focal point is defined for each illumination unit IU. Since the position of the composite focal point and the position of the corresponding light emitting device 12 are set to come close to each other, the illumination lights refracted by the different approximate planes 33a are deflected in the same divided block 30a so that the components in the traveling direction in the yz cross section come close to each other. In addition, in the same divided block 30a, the illumination lights refracted by the different approximate planes 35a are deflected so that the components in the traveling direction in the xz cross section come close to each other.

With the tilted placement of the projection lens 30, a distance between the divided block 30a and the light emitting device 12 on the yz cross section is different in each of the illumination units IU. The radius of curvature Rv of the virtual convex curved surface Sva which is the basis of the approximate plane 33a is set to be different for each divided block 30a in correspondence with the above distance, as a result of which the position of the composite focal point and the position of the corresponding light emitting device 12 can be set to come closer to each other.

On the other hand, the anisotropic deflection plane 35b located adjacent to the approximate planes 33a and 35a deflects the illumination light in a direction different from that of the separated approximate planes 33a and 35a by refraction. As a result, a part of the illumination light is mixed with the illumination light obtained by allowing a part of the illumination light incident on the projection lens 30 to be refracted by the approximate planes 33a and 35a due to the refraction by the anisotropic deflection planes 33b and 35b. Therefore, the display light emitted from the display surface 44 of the image display panel 40 is restricted from being concentrated in the emission peak direction PD2 and emitted.

The function of each deflection element 30b is exerted by the combination of striped divided lens surfaces 33 and 35 extending substantially perpendicular to each other on both surfaces 32 and 34 of the projection lens 30. Specifically, a basal direction and the amount of deflection in the deflection of the illumination light of each deflection element 30b can be determined according to the gradient in the yz cross section of the divided lens surface 33 on the incident side surface 32 and the gradient in the xz cross section of the divided lens surface 35 on the emission side surface 34. The amount of deflection can be expressed by, for example, an angular difference between the incident angle of the illumination light to one deflection element 30b and the emission angle.

In such a projection lens 30, an average value of the deflection amounts of the deflection elements 30b configuring each divided block 30a gradually changes from the short distance side toward the long distance side. In particular, in the present embodiment, the average value of the deflection amounts of the respective deflection elements 30b configuring the divided block 30a is larger on the long distance side.

In other words, the average value of the deflection amounts of the deflection elements 30b located on the short distance side of the projection lens 30 and the average value of the deflection amounts of the deflection elements 30b located on the long distance side are different from each other. In particular, in the present embodiment, the average value of the deflection amounts of the deflection elements 30b located on the long distance side is larger than the average value of the deflection amounts of the deflection elements 30b located on the short distance side.

Operations and Effects

The operations and effects of the first embodiment which is described above will be described hereinafter.

According to the first embodiment, in the image display panel 40, the normal direction ND to the display surface 44 is deviated from the optical axis OA. In addition, the projection lens 30 is tilted so as to align the radial direction DD with the tilted image display panel 40. According to the inclination of both of the projection lens 30 and the image display panel 40, since there is no angular difference of the placement, an interference between the projection lens 30 and the image display panel 40 is restricted, and a dead space can be restricted from occurring between the projection lens 30 and the image display panel 40. Therefore, the HUD device 100 having high mountability on the vehicle 1 as the movable object, which is capable of restricting an increase in the size of the HUD device 100 can be provided.

Further, according to the first embodiment, the image display panel 40 and the projection lens 30 are located in parallel to each other. With that configuration, a distance between the projection lens 30 and the image display panel 40 can be minimized while restricting the interference between the projection lens 30 and the image display panel 40.

According to the first embodiment, the condenser lens 20 located between the illumination light source unit 10 and the projection lens 30 has the light condensing surface 23 that is curved in the convex shape protruding toward the projection lens 30 side. Therefore, when the projection lens 30 is tilted according to the image display panel 40, an end of the projection lens 30 which comes closer to the condenser lens 20 side goes around a lateral space of the light condensing surface 23 along the curvature of the condensing surface 23. For that reason, an increase in the distance from the illumination light source unit 10 to the tip of the image display panel 40 can be restricted while obtaining the condensing action by the condenser lens 20 and avoiding the interference between the projection lens 30 and the condenser lens 20. Therefore, the HUD device 100 having high mountability on the vehicle 1, which is capable of restricting an increase in the size of the HUD device 100 can be provided.

According to the first embodiment, the projection lens 30 includes the multiple deflection elements 30b that are aligned with each other along the radial direction DD and deflect the traveling direction of the illumination light. The projection lens 30 is formed in a plate-shape by the array of the deflection elements 30b, thereby being capable of not only restricting an increase in the size of the HUD device 100, but also realizing appropriate illumination on each portion of the tilted image display panel 40 by the deflecting action of each deflection element 30b.

According to the first embodiment, the average value of the deflection amounts of the deflection elements 30b located on the short distance side of the projection lens 30 and the average value of the deflection amounts of the deflection elements 30b located on the long distance side are different from each other. Even if the distances from the illumination light source unit 10 are different at the respective positions of the projection lens 30, the different deflection amounts are set so as to realize the appropriate illumination according to the distances from the illumination light source unit 10 on the respective portions of the tilted image display panel 40.

In addition, according to the first embodiment, the average value of the deflection amounts of deflection elements 30b configuring each divided block 30a gradually changes from the short distance side toward the long distance side. With the above configuration, the illumination light corresponding to each light emitting device 12 is subject to a deflecting action having a different degree depending on the distance from the illumination light source unit 10. Therefore, even when the distances from the illumination light source unit 10 are different at the respective positions of the projection lens 30, the preferable illumination for the tilted image display panel 40 can be realized.

Further, according to the first embodiment, the projection lens 30 includes the multiple approximate planes 33a or 35a formed in the planar shape by partial approximation of the virtual convex curved surface Sva or Svb as a component of the deflection element 30b. Although each approximate plane 33a or 35a is planar, since the approximate plane 33a or 35a is based on the common virtual convex curved surface Sva or Svb, the traveling direction of the illumination light incident on the different approximate plane 33a or 35a is reflected by the amount of deflection corresponding to the virtual convex curved surface Sva or Svb. Therefore, substantially the same action as the light condensing action can occur between the respective illumination lights. Therefore, a restriction of an increase in size of the HUD device 100 and suitable illumination for the tilted image display panel 40 can be realized with ease of forming the projection lens 30.

Further, according to the first embodiment, the image projection unit 19 having the image display panel 40 in which the normal direction ND to the display surface 44 intersects with the optical axis OA projects the display light onto the light guide unit 50. According to the image projection unit 19 configured as described above, even when an external light such as sunlight enters the image display panel 40 in a direction opposite to that of the display light through the light guide unit 50, the external light is restricted from being reflected on the display surface 44 and visually recognized together with the display light. Therefore, the image projection unit 19 is particularly suitable for use in the HUD device 100.

In addition, the projection lens 30 is tilted so as to align the radial direction DD with the tilted image display panel 40. According to the inclination of both of the projection lens 30 and the image display panel 40, since there is no angular difference of the placement, an interference between the projection lens 30 and the image display panel 40 is restricted, and a dead space can be restricted from occurring between the projection lens 30 and the image display panel 40. Therefore, since an increase in the size of the image projection unit 19 can be restricted, the mountability of the HUD device 100 on the vehicle 1 can be improved.

Second Embodiment

As illustrated in FIGS. 10 to 13, a second embodiment according to the present disclosure is a modification of the first embodiment. A description will be given of the second embodiment, centered on features which differ from those in the first embodiment.

Figure 10:
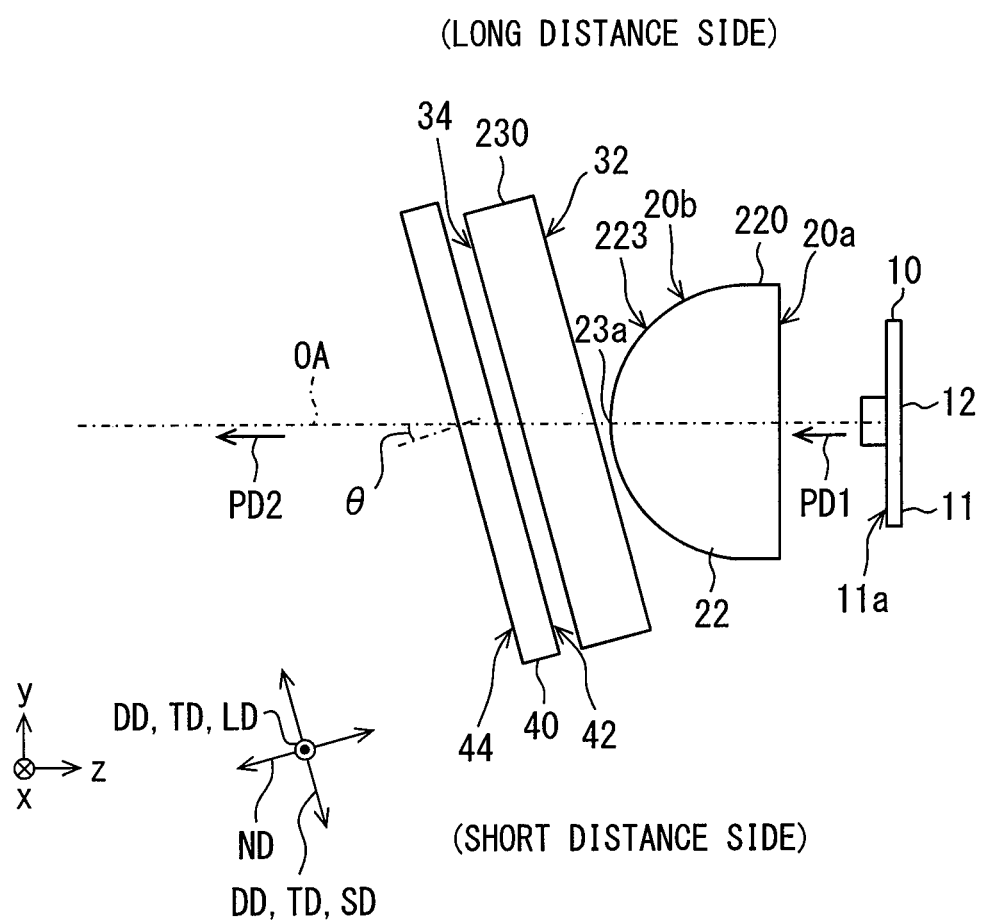
FIG. 10 is a diagram showing an image projection unit according to a second embodiment, which is a cross-sectional view schematically showing a yz cross section.
Figure 11:
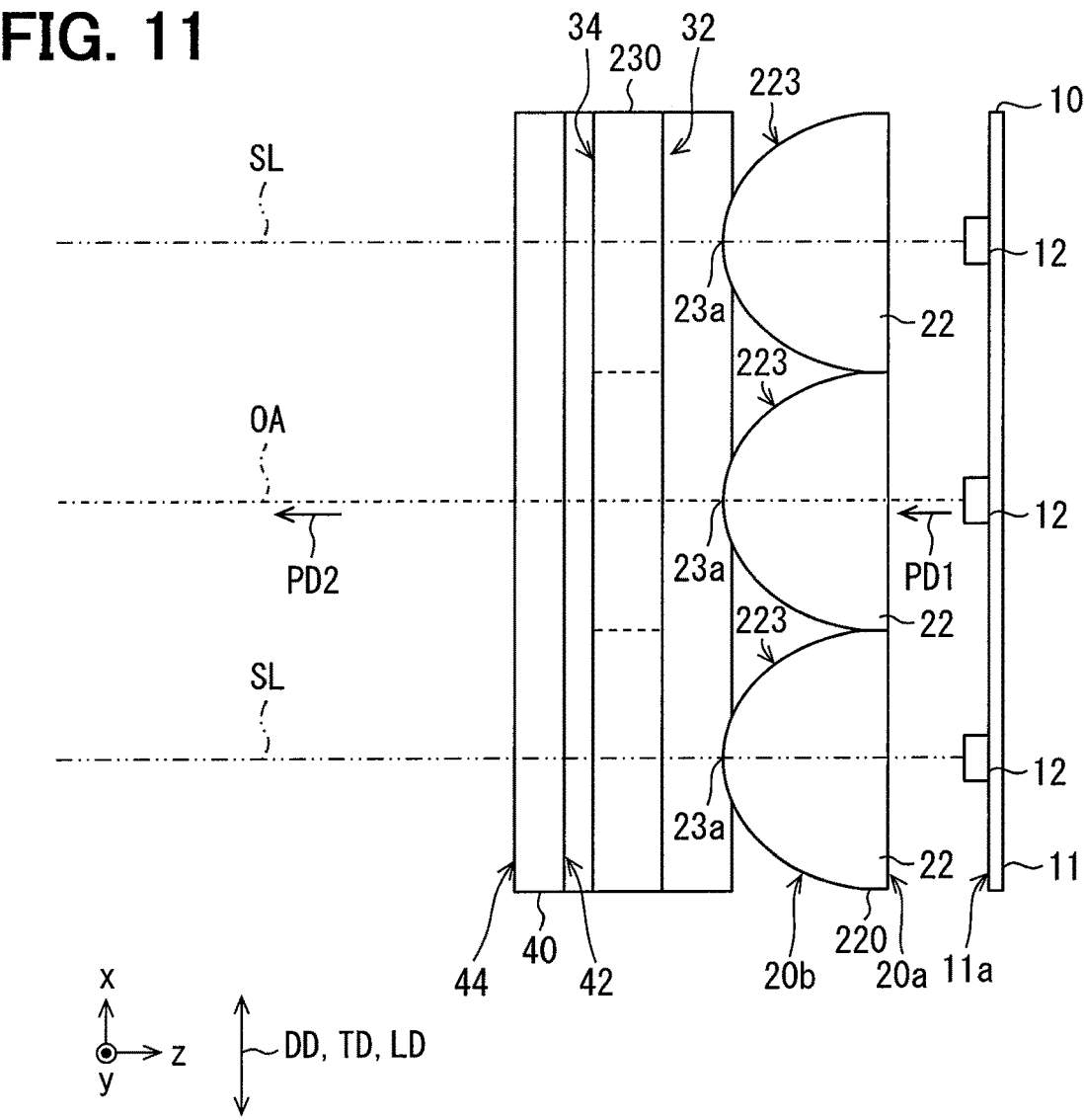
FIG. 11 is a diagram showing an image projection unit according to the second embodiment, which is a cross-sectional view schematically showing an xz cross section.

In an illumination light source unit 210 according to the second embodiment, as shown in FIGS. 10 and 11, multiple light emitting devices 12 are arrayed in a lattice pattern with one direction on a mounting surface 11a as an array direction. In the aligning direction, the number of aligned light emitting devices 12 is, for example, 1×3, that is, three in total.

In the present embodiment, a normal direction to the planar mounting surface 11a of the light source circuit board 11 is defined as a z-direction. Among directions along the mounting surface 11a, a direction in which the number of aligned light emitting devices is large, that is, the direction of aligning three light emitting devices is defined as an x-direction, and a direction in which the number of aligned light emitting devices is small, that is, the direction of aligning one light emitting device (in the present embodiment, a direction in which the light emitting devices are not substantially aligned) is defined as a y-direction.

As in the first embodiment, the respective light emitting devices 12 are located such that a light emission peak direction PD1 is aligned with the z-direction. As in the first embodiment, an optical axis OA of the illumination light source unit 210 is defined as an axis that passes through a middle light emitting device 12 located at the center of the illumination light source unit 210 and extends along the z-direction that is the light emission peak direction PD1.

As in the first embodiment, in the condenser lens 220, the convex lens elements 22 of the same number as that of the light emitting devices 12 are provided. In other words, a total of 1×3, that is, three convex lens elements 22 are aligned.

In the condenser lens 220, an incident side surface 20a has a single plane similar to that of the first embodiment. On the other hand, light condensing surfaces 223 provided for the respective convex lens elements 22, individually, are aligned on an emission side surface 20b of the condenser lens 220.

The respective light condensing surfaces 223 are aligned and placed as in the first embodiment, but a detailed shape of the condensing surfaces 223 is different from that of the first embodiment. More specifically, the respective light condensing surfaces 223 are anamorphic surfaces which are different in the radius of curvature in the x-direction and the radius of curvature in the y-direction from each other. In the present embodiment, the radius of curvature in the x-direction is smaller than the radius of curvature in the y-direction at the surface vertex 23a of each light condensing surface 223 and in the vicinity of the surface vertex 23a. In this example, the vicinity of the surface vertex 23a in the present embodiment means, for example, that a distance from the surface vertex 23a is an approximately half value of the diameter of the light condensing surface 223.

In more detail, in the xz cross section, each light condensing surface 223 is formed in a parabolic shape (refer to FIG. 11). On the other hand, in the yz cross section, each light condensing surface 223 is formed in an arc shape (in particular, in a semicircular shape in the present embodiment) (refer to FIG. 10).

As in the first embodiment, the projection lens 230 is configured by a lens array in which multiple deflection elements 30b made of light transmissive synthetic resin or glass or the like are aligned and formed integrally, and has a substantially plate-like shape as a whole. Further, in the projection lens 230, the divided blocks 30a similar to those in the first embodiment can be defined. In particular, according to the present embodiment, a total of 1×3, that is, three divided blocks 30a which are divided corresponding to the number of aligned light emitting devices 12 in the x-direction along which the light emitting devices 12 are aligned can be defined.

As in the first embodiment, the image display panel 40 is tilted so that the longitudinal direction LD along the x-direction is orthogonal to the optical axis OA and the short direction SD is tilted relative to the optical axis OA in the tangential directions TD to the display surface 44. The projection lens 230 is also tilted corresponding to the image display panel 40. When the interval between the image display panel 40 and the projection lens 230 is kept constant, the image display panel 40 and the projection lens 230 are located in parallel to each other. Furthermore, in the second embodiment, the condenser lens 220 and the projection lens 230 partially overlap with each other in a vertical direction perpendicular to the optical axis OA (y-direction on the yz cross section in the present embodiment). This is because one end of the projection lens 230 is located in a lateral space of the light condensing surface 223 due to the tilted placement of the projection lens 230.

In the second embodiment, a shape of the projection lens 230 is not particularly coincident with the above tilted placement. Hereinafter, the shape of the projection lens 230 will be described in detail.

Figure 12:
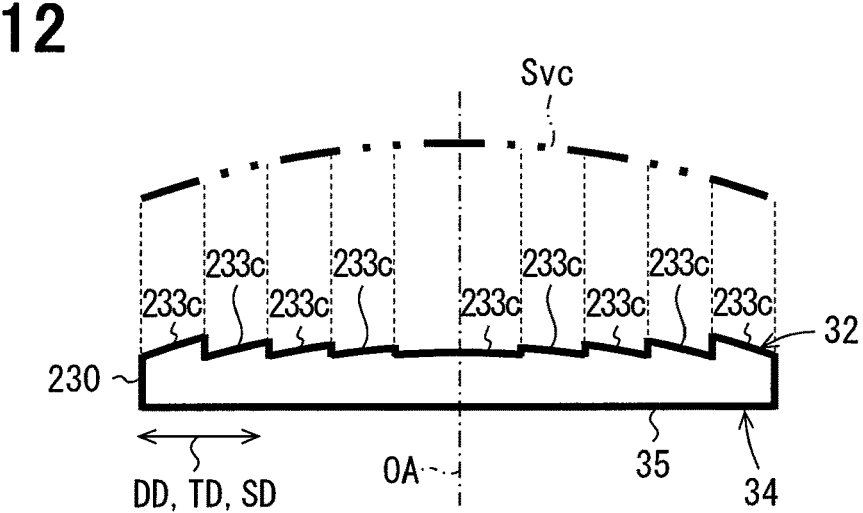
FIG. 12 is a diagram illustrating an incident side surface of a projection lens according to the second embodiment.

As shown in FIG. 12, on the incident side surface 32 of the projection lens 230, the multiple divided lens surfaces 33 are formed as components of the deflection elements 30b in a state of being divided into stripes so as to be coincident with the boundaries between the adjacent deflection elements 30b. A dividing direction of the divided lens surfaces 33 on the incident side surface 32 is along the short direction SD inclined, for example, by about 10 to 25 degrees from the y-direction. Therefore, in the xz cross section, one divided lens surface 33 is formed across the deflection element 30b and the divided block 30a.

In the present embodiment, divided convex surfaces 233c divided into a convex Fresnel lens shape are provided as the divided lens surfaces 33. The divided convex surfaces 233c are formed based on one virtual convex curved surface Svc defined as a virtual lens surface in the projection lens 230. In this example, the virtual convex curved surface Svc has a smooth cylindrical surface shape which is curved into a convex shape convexed toward the condenser lens 220 side in the yz cross section. Therefore, the incident side surface 32 is mainly configured to deflect the traveling direction of the illumination light in the yz cross section. With the provision of steps in the boundary between the divided convex surfaces 233c, the projection lens 230 is kept substantially in a plate-like shape.

Figure 13:
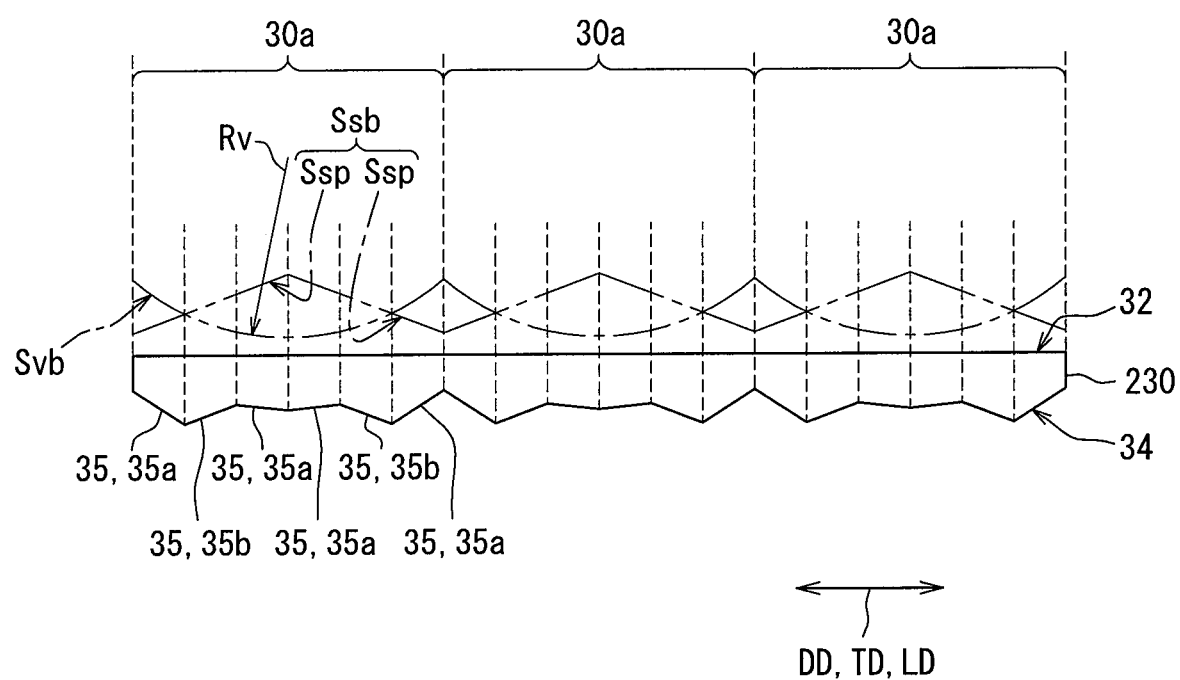
FIG. 13 is a diagram illustrating an emission side surface of the projection lens according to the second embodiment.

Further, as shown in FIG. 13, although the number of divided blocks 30a on the emission side surface 34 in the projection lens 230 is reduced corresponds to the number of aligned light emitting devices 12, the configuration in each divided block 30a is the same as that in the first embodiment.

In each divided block 30a, portions on the divided convex surfaces 233c and portions on the approximate planes 35a corresponding to the surface vertices of the virtual convex curved surfaces Svc and Svb are aligned substantially with the straight line SL extending along the optical axis OA toward the projection lens 230 side from the surface vertices 23a of the corresponding light condensing surfaces 223 in the condenser lens 220.

Also, in the second embodiment described above, since the projection lens 230 is tilted so that the radial direction DD is aligned with the tangential direction TD of the display surface 44, the operation and effects according to the first embodiment can be obtained.

Further, according to the second embodiment, since the condenser lens 220 and the projection lens 230 partially overlap with each other in the vertical direction perpendicular to the optical axis OA, a dead space between the condenser lens 220 and the projection lens 230 can be reduced.

Third Embodiment

Figure 14:
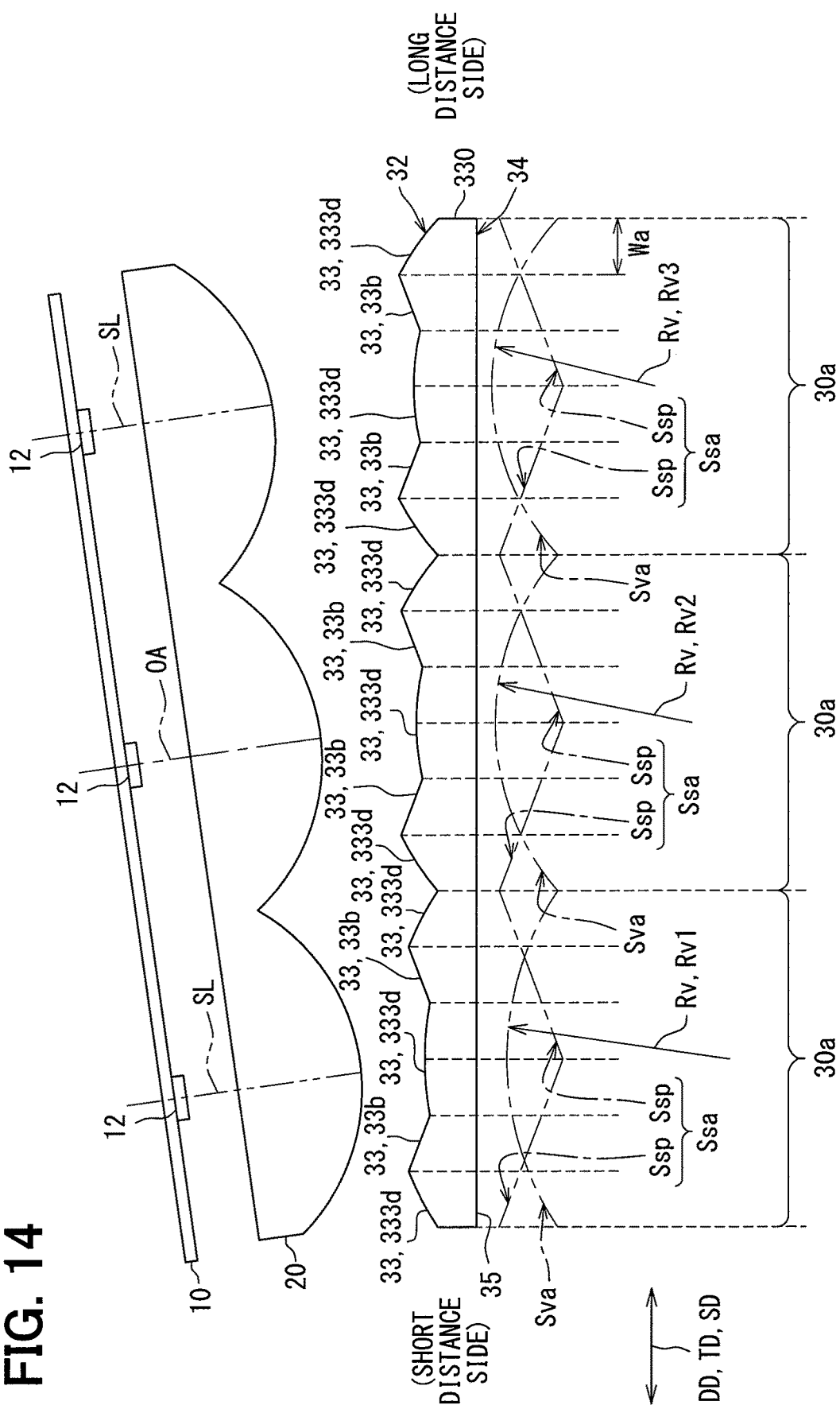
FIG. 14 is a diagram illustrating an incident side surface of a projection lens according to a third embodiment.
Figure 15:
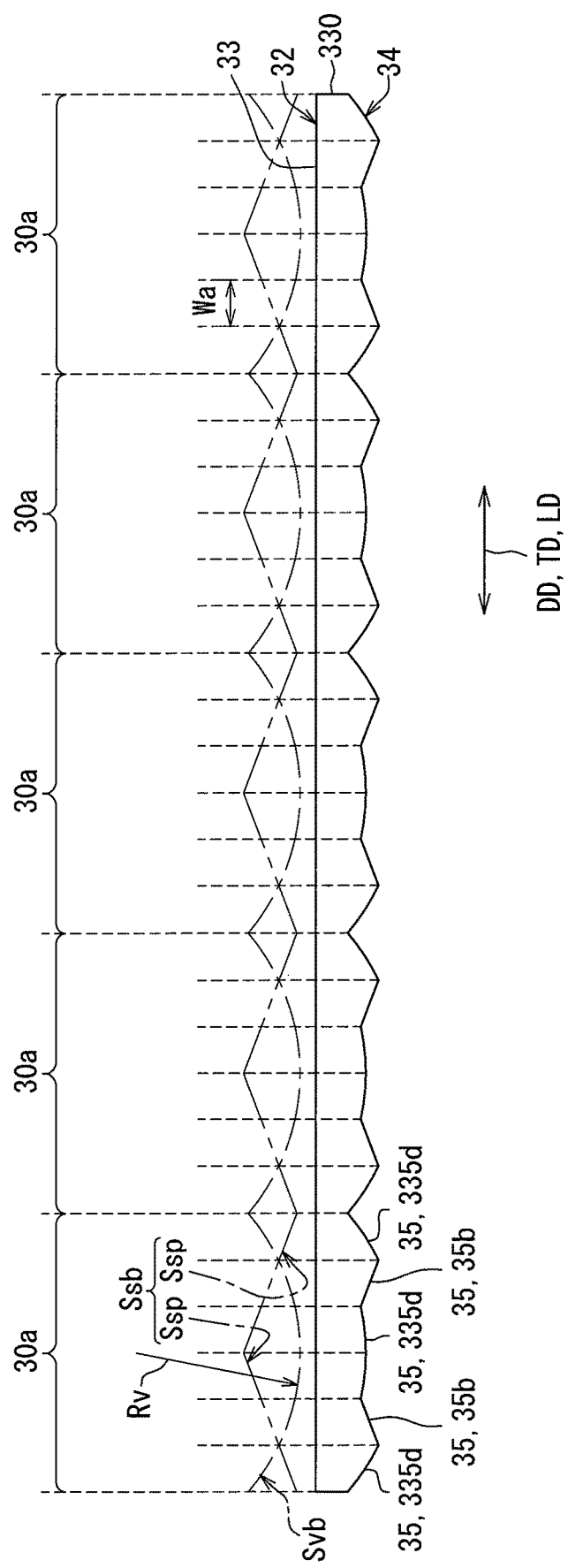
FIG. 15 is a diagram illustrating an emission side surface of the projection lens according to the third embodiment.

As illustrated in FIGS. 14 and 15, a third embodiment according to the present disclosure is a modification of the first embodiment. A description will be given of the third embodiment, centered on the points which differ from the first embodiment.

Similarly to the first embodiment, a projection lens 330 according to the third embodiment is aligned with an inclined placement. Hereinafter, the shape of the projection lens 330 will be described in detail.

On an incident side surface 32 of the projection lens 330 which faces a condenser lens 20, multiple divided lens surfaces 33 are formed as components of deflection elements 30b in a state of being divided into stripes so as to be coincident with the boundaries between the adjacent deflection elements 30b. As in the first embodiment, a dividing direction of the divided lens surfaces 33 on the incident side surface 32 extends along a short direction SD inclined, for example, by about 10 to 25 degrees from a y-direction. Each divided lens surface 33 is placed so that the component of a normal direction to the divided lens surface 33 in a yx cross section extends along an optical axis OA. The incident side surface 32 is mainly configured to deflect the traveling direction of the illumination light in the yz cross section.

On the other hand, on an emission side surface 34 of the projection lens 330 which faces an image display panel 40, multiple divided lens surfaces 35 are formed as components of the deflection elements 30b in a state of being divided into stripes so as to be coincident with the boundaries between the deflection elements 30b. As in the first embodiment, the dividing direction of the divided lens surfaces 35 in the emission side surface 34 is aligned with the longitudinal direction LD (that is, the x-direction). Each divided lens surface 35 is placed so that the component of the normal direction to the divided lens surface 33 in the xz cross section extends along the optical axis OA. The emission side surface 34 is mainly configured to deflect the traveling direction of the illumination light in the xz cross section.

In the projection lens 330 according to the third embodiment, among the divided lens surfaces 33 and 35, the approximate planes 33a and 35a according to the first embodiment are replaced by convex curved surfaces 333d and 335d which are curved in the convex shape.

The convex curved surfaces 333d and 335d are formed based on the virtual convex curved surfaces Sva and Svb defined as the virtual lens surfaces in the projection lens 330. In this example, the virtual convex curved surfaces Sva and Svb are the same as those in the first embodiment. The convex curved surfaces 333d and 335d do not approximate the virtual convex curved surfaces Sva and Svb, but parts of virtual convex curved surfaces Sva and Svb are extracted as they are, and appear on the incident side surface 32 and the emission side surface 34.

Since the two approximate planes 33a or 35a in the first embodiment are replaced by one convex curved surface 333d or 335d at the positions corresponding to the surface vertices of the virtual convex curved surfaces Sva and Svb, the division width Wa is twice the other divided regions.

The radius of curvature Rv of the virtual convex curved surface Svb on the emission side surface 34 is set to be substantially equal among the divided blocks 30a. Therefore, the emission side surface 34 has substantially the same shape for each of the divided blocks 30a which are divided into five pieces according to the number of aligned light emitting devices 12 corresponding to the x-direction.

On the other hand, the incident side surface 32 is configured with a different shape for each of the divided blocks 30a which are divided into three pieces according to the number of aligned light emitting devices 12 corresponding to the x-direction. In detail, the radius of curvature Rv of the virtual convex curved surface Sva on the incident side surface 32 is different among the divided blocks 30a. In particular, in the present embodiment, the radius of curvature Rv of the virtual convex curved surface Sva of each divided block 30a changes step by step so as to be smaller from a short distance side of the tilted projection lens 330 where a distance from the illumination light source unit 10 is short toward a long distance side of the tilted projection lens 330 where the distance from the illumination light source unit 10 is a long distance. In other words, the radius of curvature of each convex curved surface 333d varies to decrease step by step from the short distance side to the long distance side. Therefore, the gradient of the convex curved surface 333d is different for each of the divided blocks 30a, and the gradient of the convex curved surface 333d in the divided block 30a on the long distance side is relatively large as compared with the gradient on the short distance side.

As in the first embodiment, the gradient of the anisotropic deflection plane 33b is set to be substantially equal in each divided block 30a.

Similarly, in the third embodiment described above, since the projection lens 330 is tilted so that the radial direction DD is aligned with the tangential direction TD of the display surface 44, the operation and effects according to the first embodiment can be obtained.

Further, according to the third embodiment, the projection lens 30 includes the convex curved surfaces 333d and 335d that are curved in the convex shape as components of the deflection element 30b. Since the illumination light incident on the convex curved surfaces 333d and 335d is subjected to the condensing action, the restriction of an increase in the size of the HUD device 100 and suitable illumination for the tilted image display panel 40 can be realized.

In addition, according to the third embodiment, the radiuses of curvature Rv1 to Rv3 of the convex curved surfaces 333d gradually change from the short distance side to the long distance side of the projection lens 330. In this way, each illumination light having passed through each of the convex curved surfaces 333d is subjected to the condensing action having a different degree depending on the distance from the illumination light source unit 10. Therefore, even when the distances from the illumination light source unit 10 are different at the respective positions of the projection lens 330, the preferable illumination for the tilted image display panel 40 can be realized.

Other Embodiments

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

Figure 16:
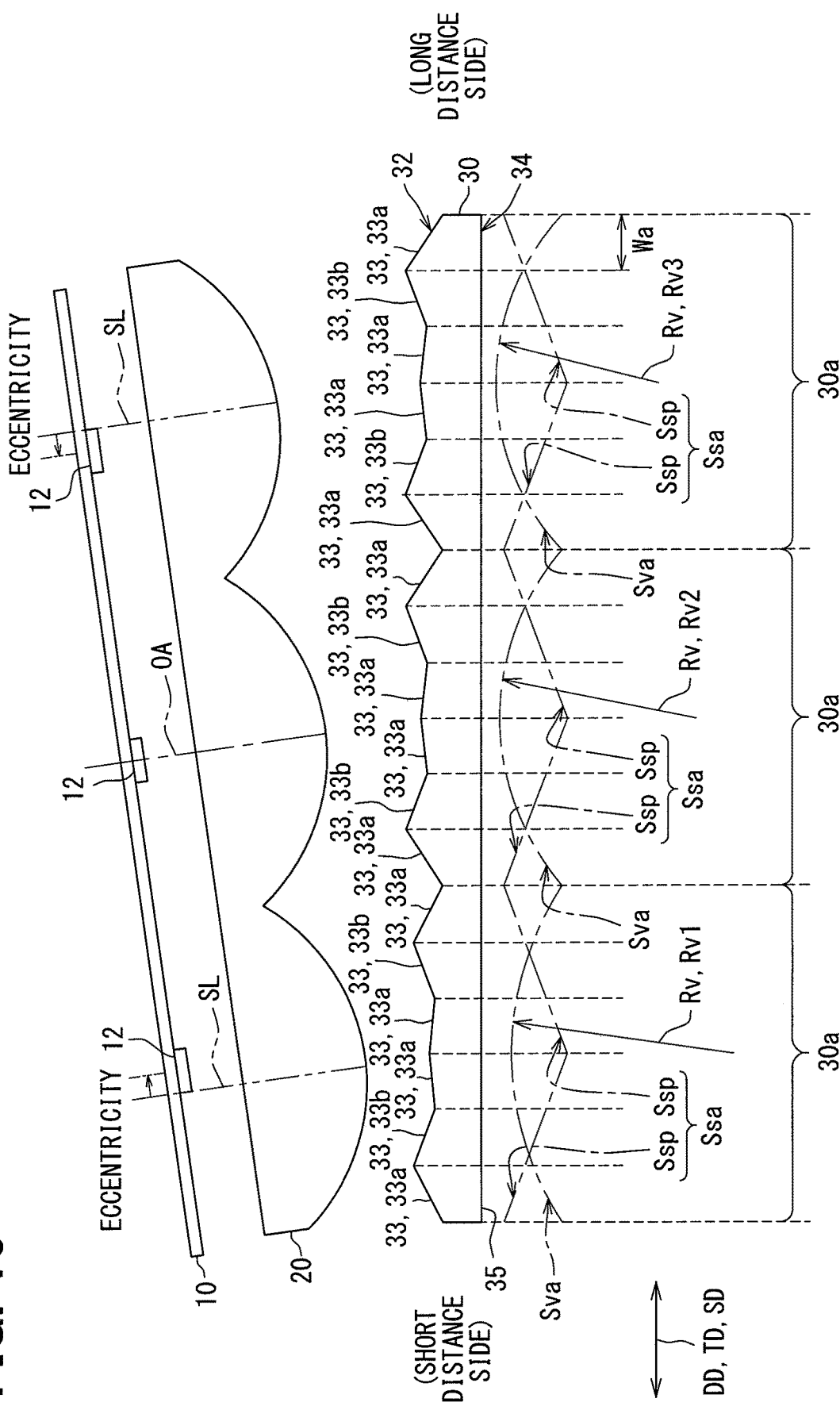
FIG. 16 is a diagram corresponding to FIG. 8 in Modification 1.

Specifically, as a modification 1, as shown in FIG. 16, the light emitting device 12 may be eccentric to a center side of the illumination light source unit 10 with respect to the array pitch of the convex lens elements 22. In that case, the amount of eccentricity of each light emitting device 12 may be set asymmetrically across the center light emitting device 12.

Figure 17:
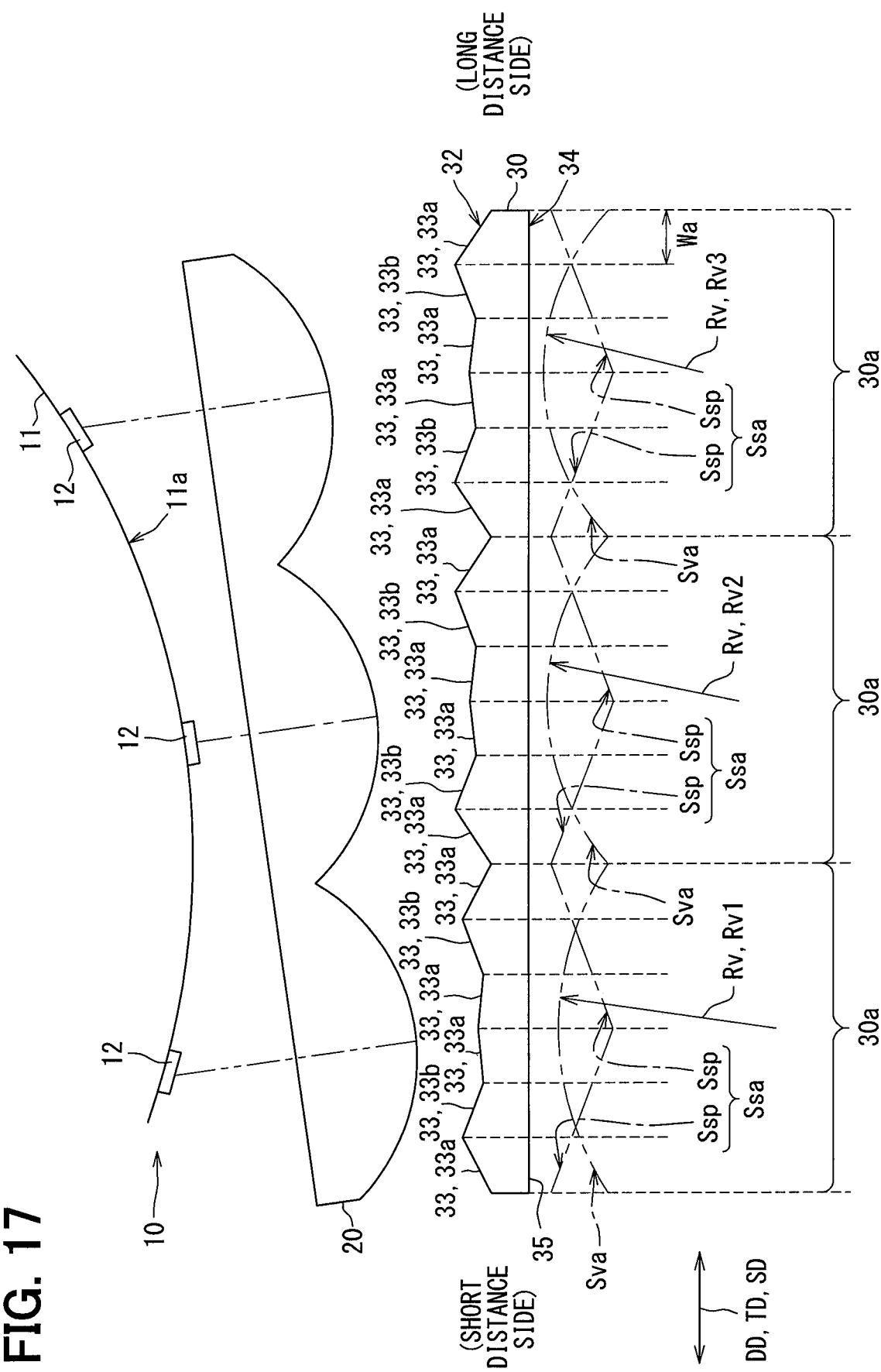
FIG. 17 is a diagram corresponding to FIG. 8 in Modification 2.

As a modification 2, instead of making the average value of the deflection amount of the deflection element 30b located on the short distance side of the projection lens 30 different from the average value of the deflection amount of the deflection element 30b located on the long distance side, or in combination with the different average values, as shown in FIG. 17, the light emitting devices 12 are not aligned in a straight line, but may be aligned with the position of the composite focal point of the convex lens elements 22 and the divided blocks 30a. In an example of FIG. 17, the light source circuit board 11 is configured by a flexible substrate having a mounting surface 11a with a wavy warped curved surface, and the multiple light emitting devices 12 are arrayed in a wavy warped shape. Therefore, the light emitting devices 12 may be placed asymmetrically with respect to the center.

As a modification 3, as shown in FIG. 18, no condenser lens 20 may be provided.

As a modification 4 of the first and third embodiments, as shown in FIG. 18, the radius of curvature Rv of the virtual convex curved surface Sva of each divided block 30a gradually increases from the short distance side toward the long distance side. In an example of FIG. 18, when it is assumed that the radius of curvature is set to Rv1, Rv2, and Rv3 in order from the divided block 30a on the short distance side, Rv1>Rv2>Rv3 is satisfied. A magnitude relationship of the radii of curvature Rv on the short distance side and the long distance side can be changed depending on design conditions such as presence or absence of the condenser lens 20, and a focal length and placement of the condenser lens 20.

As a modification 5, the division width may be set so that the sag amount of the respective divided lens surfaces 33 and 35 is kept substantially constant. Further, the number of divided lens surfaces 33 and 35 on each of the surfaces 32 and 34 or the number of arrayed deflection elements 30b can be arbitrarily set.

As a modification 6, instead of making the average value of the deflection amount of the deflection element 30b located on the short distance side of the projection lens 30 different from the average value of the deflection amount of the deflection element 30b located on the long distance side, or in combination with the different average values, a direction from the surface vertex of the virtual convex curved surface Sva toward the center of curvature may be different between the short distance side and the long distance side.

In Modification 7 of the first embodiment, as long as the approximate plane 33a is formed in a planar shape by partial approximation of the virtual convex curved surface Sva, for example, the approximate plane 33 may be formed by, for example, extracting a tangential plane of the virtual convex curved surface Sva at a midpoint of the divided region.

As a modification 8, the light condensing surface 23 may be formed in a spherical shape.

As a modification 9, the projection lens 30 may have a shape in which the shapes of the incident side surface 32 and the emission side surface 34 are interchanged with each other.

As a modification 10, the projection lens 30 may have a slight angular difference from the image display panel 40 as long as the projection lens 30 is tilted so as to align the radial direction DD with the tangential direction TD of the display surface 44.

In a modification 11, the projection lens 30 may not include the multiple deflection elements 30b aligned along the radial direction DD. Specifically, even if the convex lens has a single lens surface on each of the incident side surface 32 and the emission side surface 34, if the radius of curvature of the lens surface is set to be large, the present disclosure can be applied to such a configuration.

In Modification 12, the present disclosure may be applied to various mobile objects (transportation equipment) such as vessels or aircraft other than the vehicle 2.

The head-up display device described above is mounted on the mobile object 1 and projects display light of an image on the projection member 3 to virtually display the image in such a manner as to be visible to the occupant. The head-up display device includes the illumination light source units 10 and 210, the image display panel 40, and the projection lenses 30, 230, and 330. The illumination light source units 10 and 210 emit the illumination light. The image display panel 40 causes the illumination light from the illumination light source unit side to pass through the image display panel 40 and to be emitted as a display light from the display surface 44 as the display light to display the image. The projection lenses 30, 230, and 330 are located between the illumination light source unit and the image display panel, and projects the illumination light from the illumination light source unit side onto the image display panel. The image display panel is tilted so that the normal direction ND to the display surface intersects with the optical axis OA of the illumination light source unit. The projection lens is tilted so that the radial direction DD of the projection lens is aligned with the tangential direction TD to the display surface.

According to the above disclosure, in the image display panel, the normal direction to the display surface is deviated from the optical axis. In addition, the projection lens is tilted so as to align the radial direction with the tilted image display panel. According to the inclination of both of the projection lens and the image display panel, since there is no angular difference of the placement, an interference between the projection lens and the image display panel is restricted, and a dead space can be restricted from occurring between the projection lens and the image display panel. Therefore, the HUD device having high mountability on the movable object, which is capable of restricting an increase in the size of the HUD device can be provided.

The head-up display device 100 described above is mounted on the mobile object 1 and projects display light of an image on the projection member 3 to virtually display the image in such a manner as to be visible to the occupant. In the head-up display device 100, the image projection unit 19 projects the display light onto the light guide unit 50 that guides the display light to the projection member. The image projection unit 19 includes the illumination light source units 10 and 210, the image display panel 40, and the projection lenses 30, 230, and 330. The illumination light source units 10 and 210 emit the illumination light. The image display panel 40 causes the illumination light from the illumination light source unit side to pass through the image display panel 40 and to be emitted as a display light from the display surface 44 as the display light to display the image. The projection lenses 30, 230, 330 are located between the illumination light source unit and the image display panel, and project the illumination light from the illumination light source unit side onto the image display panel. The image display panel is tilted so that the normal direction ND to the display surface intersects with the optical axis OA of the illumination light source unit. The projection lens is tilted so that the radial direction DD of the projection lens is aligned with the tangential direction TD to the display surface.

Further, according to the above embodiment, the image projection unit having the image display panel in which the normal direction to the display surface intersects with the optical axis projects the display light onto the light guide unit. According to the image projection unit configured as described above, even when an external light such as sunlight enters the image display panel in a direction opposite to that of the display light through the light guide unit, the external light is restricted from being reflected on the display surface and visually recognized together with the display light. Therefore, the image projection unit is particularly suitable for use in the HUD device.

In addition, the projection lens is tilted so as to align the radial direction with the tilted image display panel. According to the inclination of both of the projection lens and the image display panel, since there is no angular difference of the placement, an interference between the projection lens and the image display panel is restricted, and a dead space can be restricted from occurring between the projection lens and the image display panel. Therefore, since an increase in the size of the image projection unit can be restricted, the mountability of the HUD device on the movable object can be improved.

The present disclosure has been described based on the embodiments; however, it is understood that this disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements are added to the various combinations or aspects, also fall within the scope or technical idea of the present disclosure.

What is claimed is:

1. A head-up display device configured to be mounted on a movable object and to project a display light of an image on a projection member to display a virtual image of the image visually to be recognizable by an occupant, the head-up display device comprising:
   an illumination light source unit configured to emit an illumination light;
   an image display panel configured to cause the illumination light from the illumination light source unit to pass therethrough to be emitted as the display light from a display surface to display the image; and
   a projection lens located between the illumination light source unit and the image display panel and configured to project the illumination light from the illumination light source unit onto the image display panel, wherein
   the image display panel is tilted to cause a normal direction to the display surface to intersect with an optical axis of the illumination light source unit,
   the projection lens is tilted to cause a radial direction of the projection lens to coincide with a tangential direction to the display surface, and
   the projection lens includes a plurality of deflection elements aligned with each other in the radial direction and configured to deflect a traveling direction of the illumination light.

2. The head-up display device according to claim 1, wherein the image display panel and the projection lens are located parallel to each other.

3. The head-up display device according to claim 1, further comprising:
   a condenser lens located between the illumination light source unit and the projection lens, the condenser lens configured to condense the illumination light from the illumination light source unit and to emit the condensed illumination light toward the projection lens, wherein
   the condenser lens includes a curved light condensing surface in a convex shape protruding toward the projection lens.

4. The head-up display device according to claim 3, wherein the condenser lens and the projection lens partially overlap with each other in a vertical direction perpendicular to the optical axis.

5. The head-up display device according to claim 1, wherein
   an average value of deflection amounts of the deflection elements on a short distance side, in which a distance of the projection lens from the illumination light source unit is short, is different from an average value of the deflection amounts of the deflection elements on a long distance side, in which the distance of the projection lens from the illumination light source unit is long.

6. The head-up display device according to claim 1, wherein
   the illumination light source unit includes a plurality of light emitting devices aligned with each other,
   divided blocks are defined by virtually dividing the projection lens in a direction of and correspondingly to the number of the aligned light emitting devices, and
   the average value of the deflection amounts of the deflection elements configuring respective one of the divided blocks gradually changes from a short distance side, in which a distance of the projection lens from the illumination light source unit is short, toward a long distance side, in which the distance of the projection lens from the illumination light source unit is long.

7. The head-up display device according to claim 1, wherein
   a virtual convex curved surface curved in a convex shape is defined as a virtual lens surface of the projection lens, and
   the projection lens includes a plurality of approximate planes formed in a planar shape by partial approximation of the virtual convex curved surface as components of the deflection elements.

8. The head-up display device according to claim 1, wherein the projection lens includes a convex curved surface curved in a convex shape as a component of the deflection element.

9. The head-up display device according to claim 8, wherein
the convex curved surface includes a plurality of convex curved surfaces, and
a radius of curvature of respective one of the convex curved surfaces gradually changes from a short distance side, in which a distance of the projection lens from the illumination light source unit is short, toward a long distance side, in which the distance of the projection lens from the illumination light source unit is long.

10. An image projection unit for a head-up display device, the head-up display device configured to be mounted on a movable object and to project a display light of an image on a projection member to display a virtual image of the image to be visually recognizable by an occupant, the image projection unit configured to project the display light onto a light guide unit, which is configured to guide the display light to the projection member, the image projection unit comprising:

an illumination light source unit configured to emit an illumination light;

an image display panel configured to cause the illumination light from the illumination light source unit to pass therethrough and to be emitted as the display light from a display surface to display the image; and a projection lens located between the illumination light source unit and the image display panel and configured to project the illumination light from the illumination light source unit onto the image display panel, wherein the image display panel is tilted to cause a normal direction to the display surface to intersect with an optical axis of the illumination light source unit, the projection lens is tilted to cause a radial direction of the projection lens to coincide with a tangential direction to the display surface, and the projection lens includes a plurality of deflection elements aligned with each other in the radial direction and configured to deflect a traveling direction of the illumination light.

\* \* \* \* \*